(12) United States Patent
Motohashi et al.

(10) Patent No.: US 8,837,364 B2
(45) Date of Patent: Sep. 16, 2014

(54) BASE STATION DEVICE, TERMINAL DEVICE AND COMMUNICATION SYSTEM

(75) Inventors: Kayo Motohashi, Kawasaki (JP); Masanori Hashimoto, Kawasaki (JP); Tetsuo Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 225 days.

(21) Appl. No.: 13/307,526

(22) Filed: Nov. 30, 2011

(65) Prior Publication Data
US 2012/0076079 A1 Mar. 29, 2012

Related U.S. Application Data

(63) Continuation of application No. PCT/JP2009/060394, filed on Jun. 5, 2009.

(51) Int. Cl.
*H04W 4/00* (2009.01)
*H04W 52/02* (2009.01)
*H04W 76/00* (2009.01)
*H04W 24/00* (2009.01)
*H04W 36/08* (2009.01)
*H04W 88/08* (2009.01)

(52) U.S. Cl.
CPC ............ *H04W 52/028* (2013.01); *H04W 24/00* (2013.01); *H04W 36/08* (2013.01); *H04W 76/00* (2013.01); *H04W 88/08* (2013.01)
USPC ........................................................ 370/328

(58) Field of Classification Search
None
See application file for complete search history.

(56) References Cited

U.S. PATENT DOCUMENTS

| | | | |
|---|---|---|---|
| 6,633,762 B1 | 10/2003 | Rauscher | |
| 8,200,782 B2 * | 6/2012 | Pradhan et al. | 709/218 |
| 8,447,844 B2 * | 5/2013 | Kimura | 709/220 |
| 2001/0041569 A1 | 11/2001 | Rahman | |
| 2002/0082020 A1 | 6/2002 | Lee et al. | |
| 2002/0110100 A1 | 8/2002 | Itoh | |
| 2004/0204184 A1 | 10/2004 | Lin | |
| 2005/0266846 A1 | 12/2005 | Kim | |
| 2009/0197633 A1 * | 8/2009 | Kawamoto et al. | 455/522 |
| 2012/0093103 A1 * | 4/2012 | Lee et al. | 370/329 |

FOREIGN PATENT DOCUMENTS

| | | |
|---|---|---|
| EP | 1 075 160 A1 | 2/2001 |
| EP | 1 207 712 A2 | 5/2002 |
| JP | 2001-016633 | 1/2001 |
| JP | 2003-224875 | 8/2003 |
| JP | 2003-536349 | 12/2003 |
| JP | 2008-501281 | 1/2008 |
| WO | 2007/066399 | 6/2007 |

OTHER PUBLICATIONS

International Search Report issued for corresponding International Patent Application No. PCT/JP2009/060394, mailed Sep. 1, 2009. English translation attached.

Extended European search report, the supplementary European search report and the European search opinion issued for the corresponding European Patent Application Number 09845544.7, dated Jun. 6, 2014.

* cited by examiner

*Primary Examiner* — Andrew Lai
*Assistant Examiner* — Leon Andrews
(74) *Attorney, Agent, or Firm* — Myers Wolin, LLC

(57) ABSTRACT

A base station device including: a receiver that receives data from a terminal device; and a processor that performs setting for the reception of data from the terminal device, and deactivates a management of the terminal device after performing setting, wherein the receiver receives data from the terminal device in a state of deactivated management.

9 Claims, 19 Drawing Sheets

US 8,837,364 B2

BASE STATION DEVICE, TERMINAL DEVICE AND COMMUNICATION SYSTEM

CROSS-REFERENCE TO RELATED APPLICATION

This application is a continuation application of PCT/JP2009/060394 filed Jun. 5, 2009, the contents of which are herein wholly incorporated by reference.

FIELD

A certain aspect of the embodiments is related to a base station device, a terminal device and a communication system.

BACKGROUND

In a communication system in which a base station device and a terminal device such as a mobile terminal communicate wirelessly with each other, the terminal device moves in the inside of a cell of the base station device, and between cells of the base station device. Consequently, movement control according to the movement of the terminal device is carried out. On the contrary, there is a case where the terminal device is used in a half-fixed condition. For example, it is considered to connect the terminal device to a household appliance, and control the household appliance with a communication system.

When the terminal device is an unmoving device, a communication system which does not perform control concerning movement of the terminal device, such as handover, is known (e.g. International Publication Pamphlet No. WO2007/066399).

SUMMARY

According to an aspect of the present invention, there is provided a base station device including: a receiver that receives data from a terminal device; and a processor that performs setting for the reception of data from the terminal device, and deactivates a management of the terminal device after performing setting, wherein the receiver receives data from the terminal device in a state of deactivated management.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will be given of embodiments of the invention, with reference to drawings.

Embodiment 1

Figure 1:
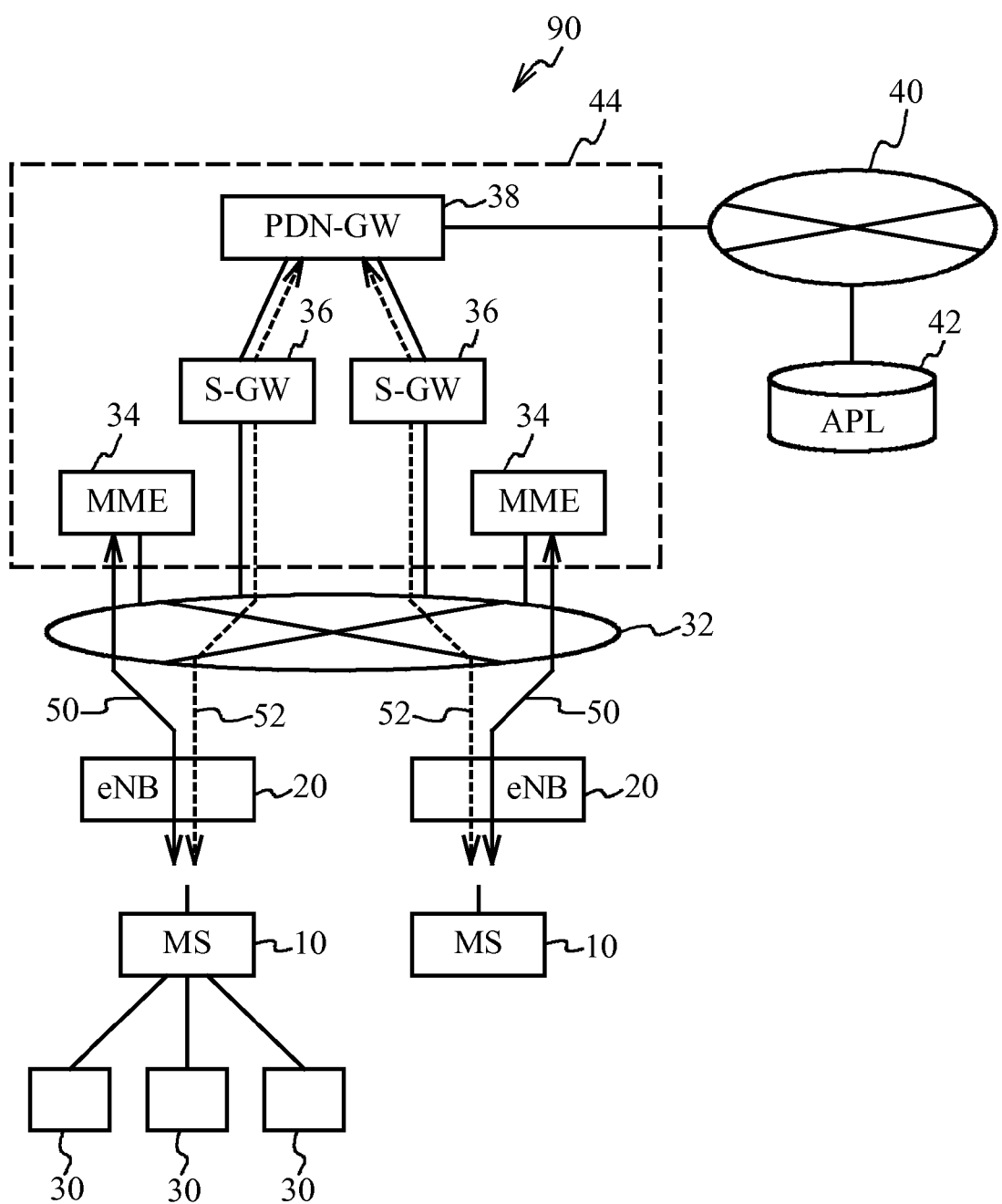
FIG. 1 is a diagram illustrating an example of a communication system used in a first embodiment.

FIG. 1 is a diagram illustrating a network system of a next-generation 3GPP (3rd Generation Partnership Project) as an example of a communication system used in a first embodiment. A communication system 90 includes terminal devices (MS: Mobile station) 10, base station devices (eNB: Evolved-UTRAN Node B) 20, a network 32, and a base station control device 44. The communication system 90 is connected to an application server (APL) 42 via an IMS (IP Multimedia Subsystem) 40.

The terminal device 10 is a mobile terminal such as a cell-phone or a half-fixed terminal (non-mobile terminal) connected to household appliances 30. The base station control device 44 includes MMEs (Mobility Management Entity) 34, S-GWs (Service Gate Way) 36, and a PDN-GW (Packet Data Node Gate Way) 38. The MME 34 manages connection between the base station device 20 and the terminal device 10, and the movement of the terminal device 10. Moreover, the MME 34 manages the transmission and reception of data between the terminal device 10 and the APL 42 via the IMS 40. A control plane is set between the terminal device 10 and the MME 34 via the base station device 20 and the network 32. The S-GW 36 and the PDN-GW 38 perform the transmission and reception of data between the terminal device 10 and the APL 42. A user plane 52 is set between the terminal device 10 and the PDN-GW 38 via the base station device 20, the network 32 and the S-GW 36. Thus, control of the terminal device 10 by the MME 34 is performed via the control plane 50. Data transmission and reception between the PDN-GW 38 and the terminal device 10 is performed via the user plane 52.

Figure 2:
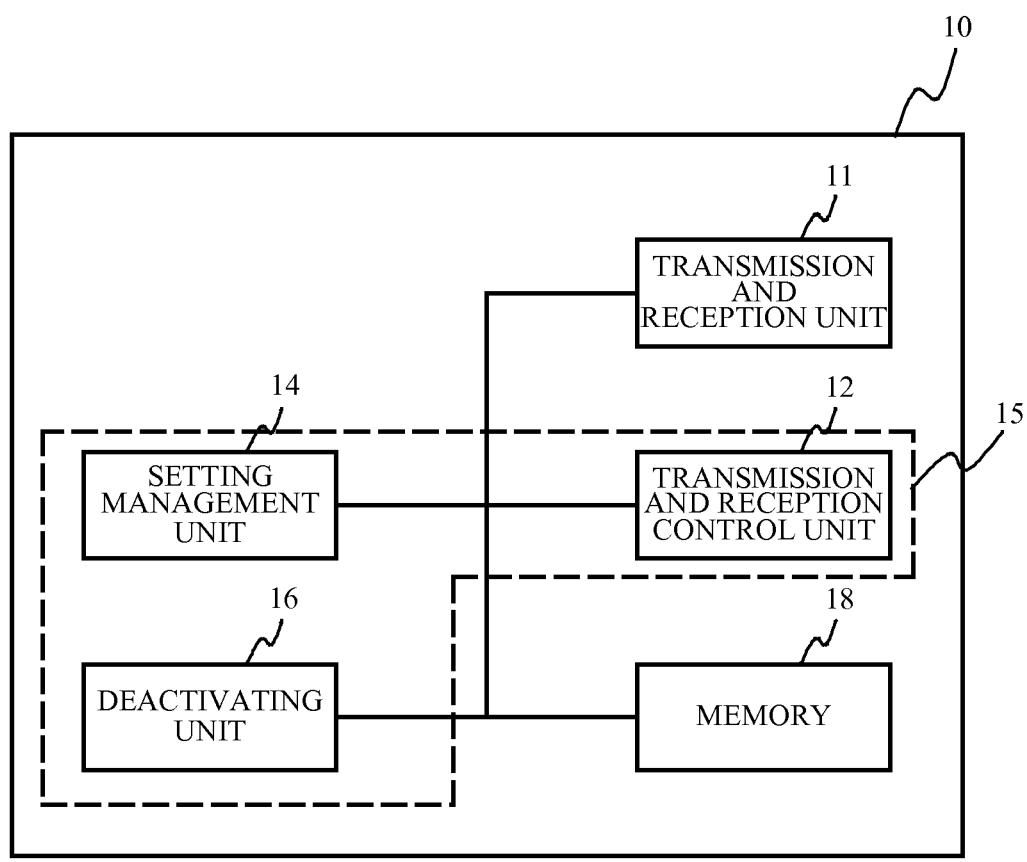
FIG. 2 is a function block diagram of a terminal device of the first embodiment.

FIG. 2 is a function block diagram of the terminal device 10. The terminal device 10 includes a transmission and reception unit 11, a transmission and reception control unit 12, a setting management unit 14, a deactivating unit 16, and a memory 18. The transmission and reception unit 11 performs the transmission and reception of data to and from the base station device 20. The transmission and reception control unit 12 controls the transmission and reception unit 11, and controls the transmission and reception of data to and from the base station device 20. The setting management unit 14 performs movement control for managing movement of the terminal device 10. The setting management unit 14 performs handover based on an instruction of the MME 34, for example. The setting management unit 14 performs power control of a radio wave that the transmission and reception unit 11 transmits, based on an instruction of the MME 34. The setting management unit 14 further performs setting in which the transmission and reception control unit 12 performs the transmission and reception of data to and from the base station device 20. For example, the setting management unit 14 sets the user plane 52 to the base station device 20 based on an instruction from the base station device 20. The deactivating unit 16 deactivates functions of the setting management unit 14 based on an instruction from the base station device 20. The memory 18 stores a flag indicating whether the terminal device 10 is the mobile terminal or non-mobile terminal, for example. The transmission and reception control unit 12, the setting management unit 14, and the deactivating unit 16 are achieved by a processor 15 (e.g. a CPU (Central Processing Unit), a DSP (Digital Signal Processor), or the like).

Figure 3:
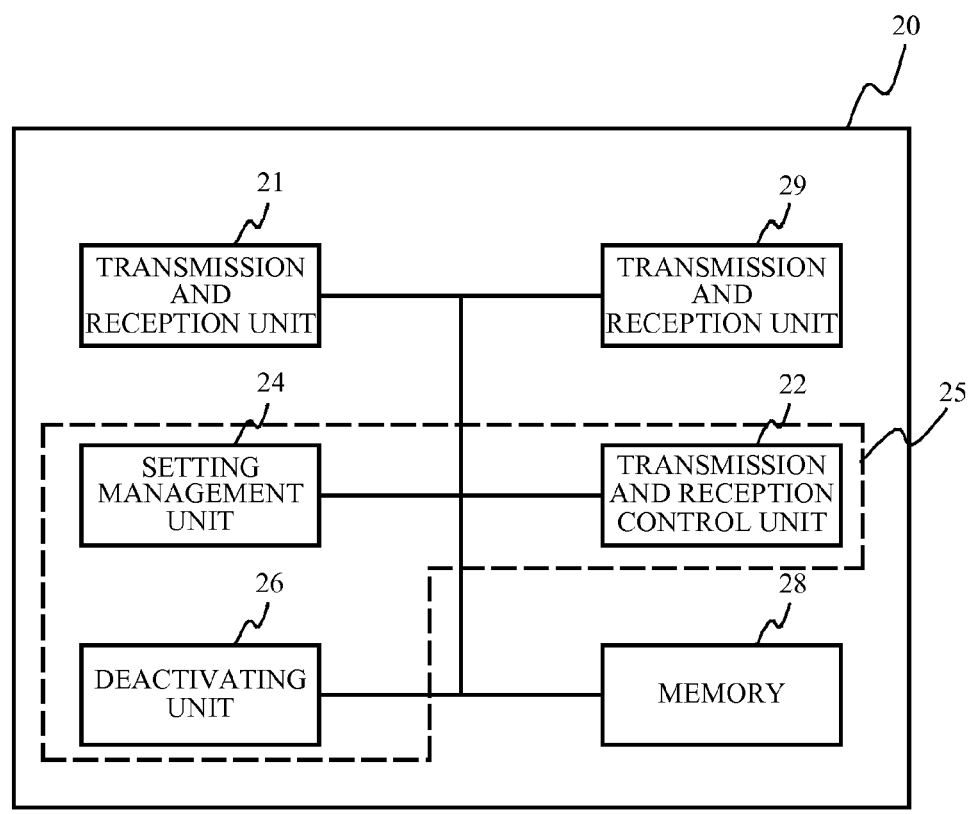
FIG. 3 is a function block diagram of a base station device of the first embodiment.

FIG. 3 is a function block diagram of the base station device 20. The base station device 20 includes transmission and reception units 21 and 29, a transmission and reception control unit 22, a setting management unit 24, a deactivating unit 26, and a memory 28. The transmission and reception unit 21 performs the transmission and reception of data to and from the terminal device 10. The transmission and reception unit 29 performs the transmission and reception of data to and from the base station control device 44. The transmission and reception control unit 22 controls the transmission and reception unit 21, and controls the transmission and reception of data to and from the terminal device 10. The setting management unit 24 performs movement control for managing movement of the terminal device 10. The setting management unit 24 performs handover based on an instruction of the MME 34, for example. The setting management unit 24 further performs setting in which the transmission and reception control unit 22 performs the transmission and reception of data to and from the terminal device 10. For example, the setting management unit 24 sets the user plane 52 to the terminal device 10. The deactivating unit 26 deactivates functions of the setting management unit 24. The memory 28 stores the flag indicating whether the terminal device 10 is the mobile terminal or non-mobile terminal, for example. The transmission and reception control unit 22, the setting management unit 24, and the deactivating unit 26 are achieved by a processor 25 (e.g. a CPU (Central Processing Unit), a DSP (Digital Signal Processor), or the like).

Figure 4:
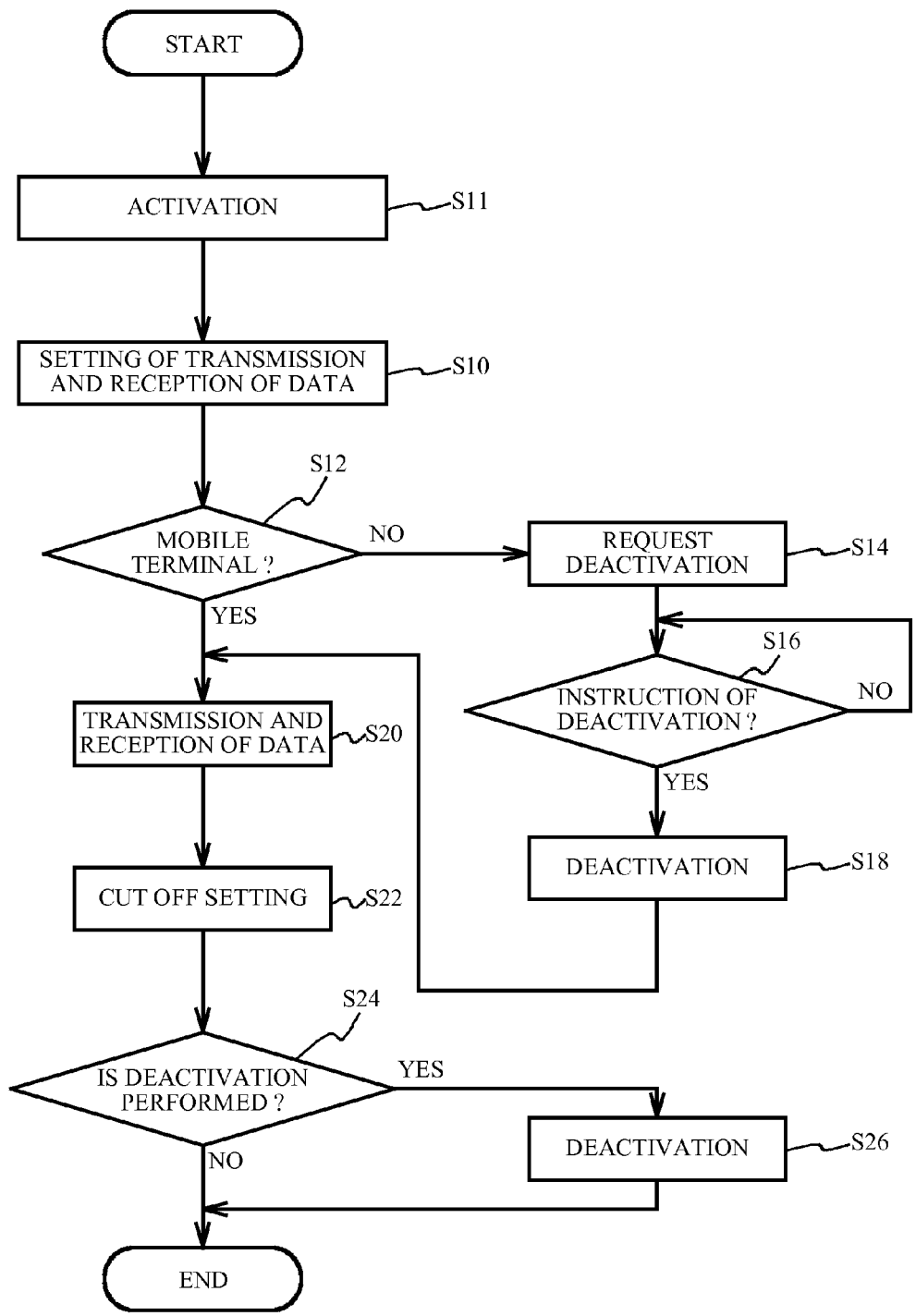
FIG. 4 is a flowchart illustrating the operation of the terminal device of the first embodiment.

FIG. 4 is a flowchart illustrating the operation of the terminal device 10. In the following description, a process to be performed by any one of the transmission and reception control unit 12, the setting management unit 14, and the deactivating unit 16 is performed by a processor 15. First, the deactivating unit 26 activates the setting management unit 14 (step S11). For example, the deactivating unit 26 sets the control plane 50 between the terminal device 10 and the MME 34. The setting management unit 14 performs setting of the transmission and reception of data (step S10). For example, the setting management unit 14 sets the user plane 52 between the terminal device 10 and the PDN-GW 38. Next, the deactivating unit 16 judges whether the terminal device 10 is the mobile terminal (step S12). For example, a user judges whether the terminal device 10 is the mobile terminal or non-mobile terminal, and sets the flag in the memory. The deactivating unit 16 reads out the flag in the memory, and judges whether the terminal device 10 is the mobile terminal or non-mobile terminal. When the judgment of step S12 is YES, the procedure proceeds to step S20.

When the judgment of step S12 is NO, the deactivating unit 16 requests the deactivation of the setting management unit 24 from the base station device 20 (step S14). For example, the deactivating unit 16 requests disconnection of the control plane 50. The deactivating unit 16 judges whether to receive an instruction of the deactivation from the base station device 20 (step S16). When the judgment of step S16 is NO, the procedure returns to step S16. When the judgment of step S16 is YES, the deactivating unit 16 deactivates the setting management unit 14 (step S18). For example, the deactivating unit 16 disconnects the control plane 50 to the base station device 20. Thereby, the resource maintaining the control plane 50 is released.

The transmission and reception control unit 12 performs the transmission and reception of data to and from the base station device 20. For example, the transmission and reception control unit 12 performs the transmission and reception of the data via the APL 42 and the user plane 52 (step S20). After the completion of the transmission and reception of the data, the transmission and reception control unit 12 cuts off the setting of the transmission and reception of the data (step S22). For example, the transmission and reception control unit 12 disconnects the user plane 52 to the base station device 20. Next, the deactivating unit 16 judges whether to deactivate the setting management unit 14 (step S24). For example, when the setting management unit 24 has been already deactivated in step S18, the deactivating unit 16 judges step S24 as NO. When the setting management unit 24 has been not deactivated, the deactivating unit 16 judges step S24 as YES. When the judgment of step S24 is NO, the procedure is completed. When the judgment of step S24 is YES, the deactivating unit 16 deactivates the setting management unit 14 (step S26). For example, the deactivating unit 16 disconnects the control plane 50.

Figure 5:
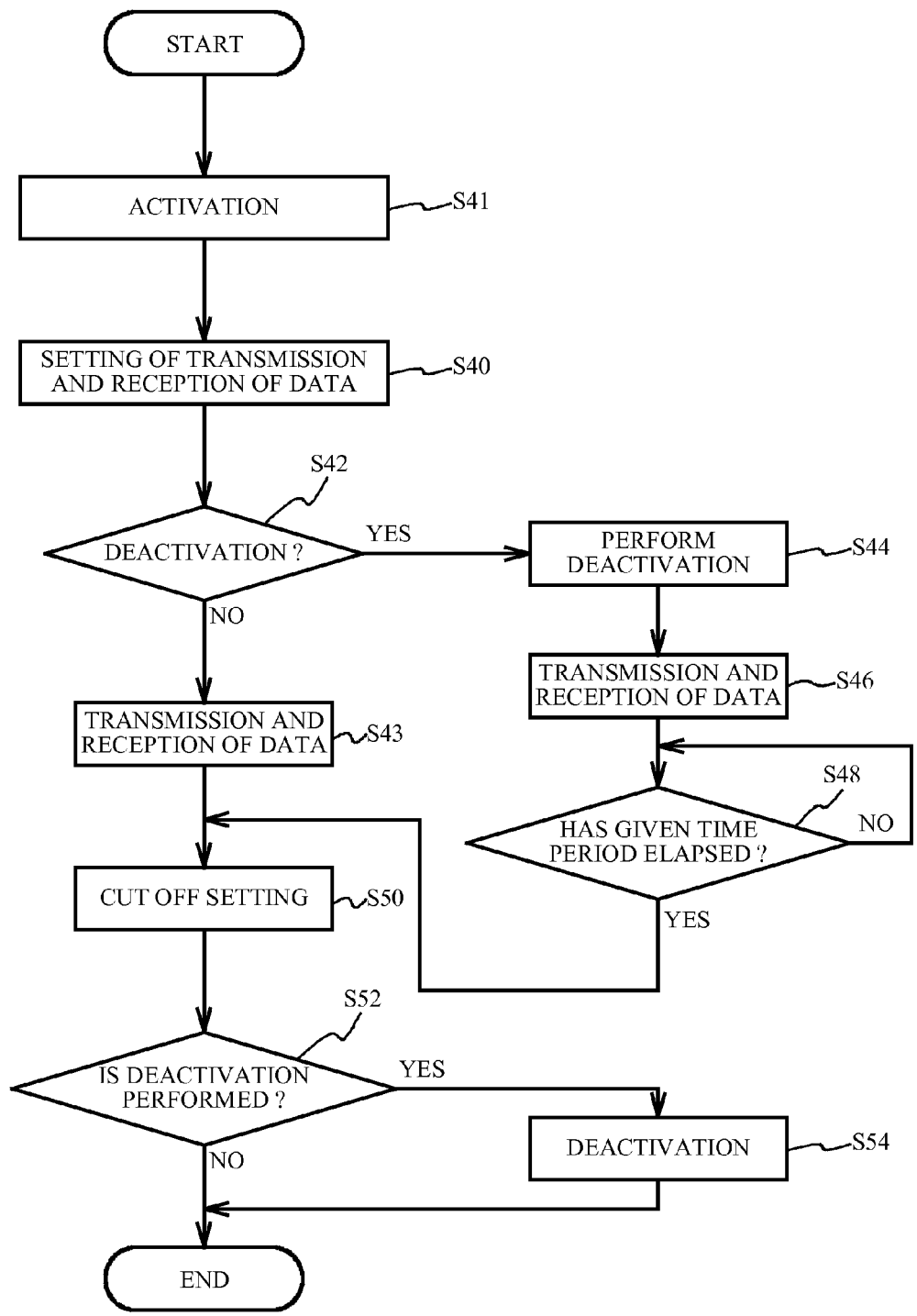
FIG. 5 is a flowchart illustrating the operation of the base station device of the first embodiment.

FIG. 5 is a flowchart illustrating the operation of the base station device 20. In the following description, a process to be performed by any one of the transmission and reception control unit 22, the setting management unit 24, and the deactivating unit 26 is performed by a processor 25. First, the deactivating unit 26 activates the setting management unit 14 (step S41). Next, the setting management unit 24 performs the setting of the transmission and reception of data (step S40). For example, the setting management unit 24 sets the user plane 52 between the terminal device 10 and the PDN-GW 38. The transmission and reception control unit 22 performs traffic management of the user plane 52, for example. Next, the deactivating unit 26 judges whether to deactivate the setting management unit 24 (step S42). For example, when the deactivating unit 26 receives a request of the deactivation from the terminal device 10, the deactivating unit 26 judges step S42 as YES. When the deactivating unit 26 does not receive the request of the deactivation from the terminal device 10, the deactivating unit 26 judges step S42 as NO. When the judgment of step S42 is NO, the transmission and reception control unit 22 performs the transmission and reception of data to and from the terminal device 10 (step S43). The procedure proceeds to step S50.

When the judgment of step S42 is YES, the deactivating unit 26 deactivates the setting management unit 24 (step S44). For example, the deactivating unit 26 disconnects the control plane 50 to the terminal device 10. The transmission and reception control unit 22 performs the transmission and reception of data to and from the terminal device 10 (step S46). The transmission and reception control unit 22 performs traffic management of the user plane. When the transmission and reception of the data is completed, the transmission and reception control unit 22 judges whether a given time period has elapsed after the transmission and reception of the data is completed (step S48). When the judgment of step S48 is NO, the procedure returns to step S48. When the judgment of step S48 is YES, the procedure proceeds to step S50.

In step S50, the transmission and reception control unit 22 cuts off the setting of the transmission and reception of the data (step S50). For example, the transmission and reception control unit 22 disconnects the user plane 52 to the terminal device 10. Next, the deactivating unit 26 judges whether to deactivates the setting management unit 24 (step S52). For example, when the setting management unit 24 has been already deactivated in step S44, the deactivating unit 26 judges step S52 as NO. When the setting management unit 24 has been not deactivated, the deactivating unit 26 judges step S52 as YES. When the judgment of step S52 is NO, the procedure is completed. When the judgment of step S52 is YES, the deactivating unit 26 deactivates the setting management unit 24 (step S54). For example, the deactivating unit 26 disconnects the control plane 50.

Figure 6:
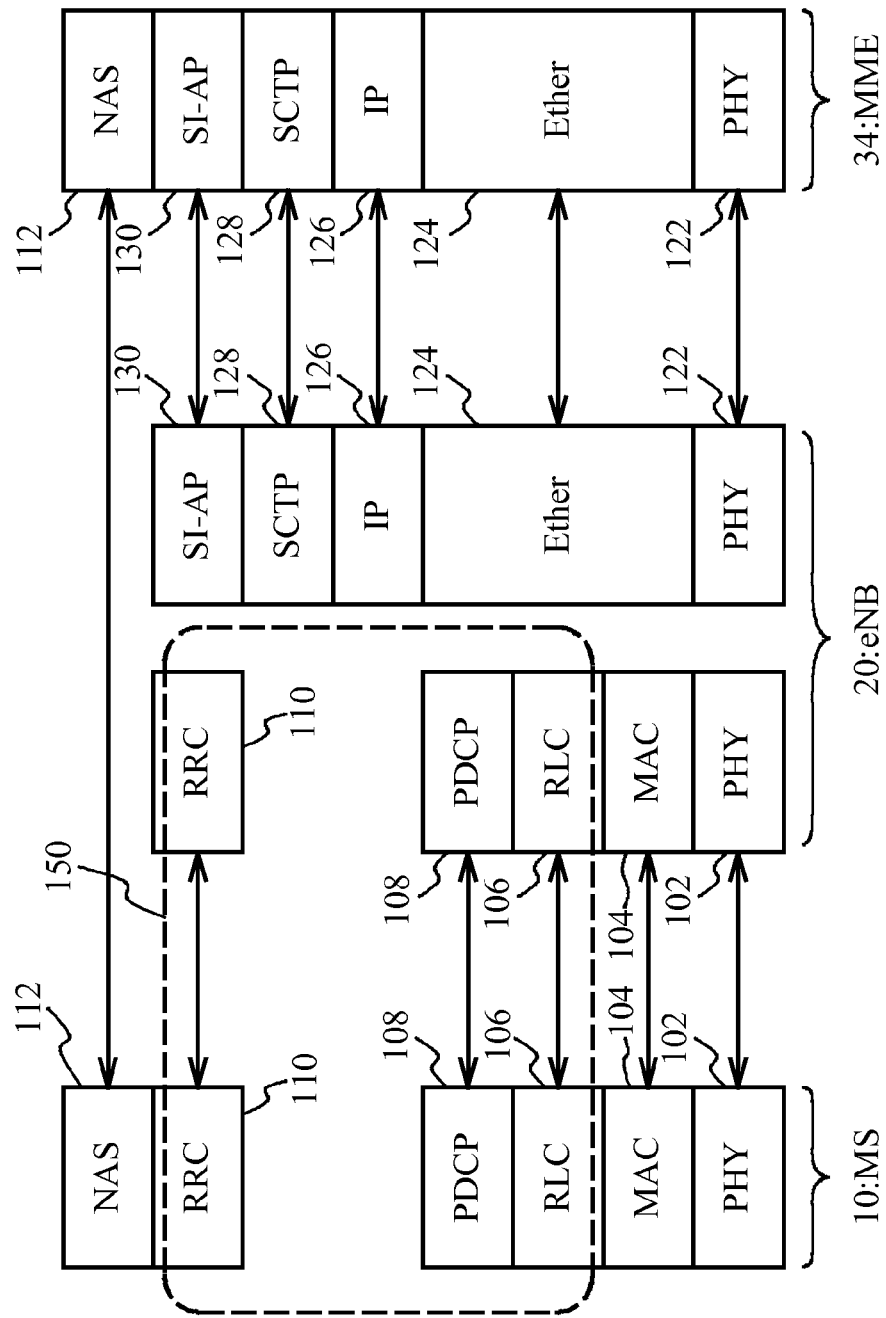
FIG. 6 is an example of protocols that the terminal device, the base station device, and a MME of the first embodiment implement.

Next, a description will be given of an example which applies the first embodiment to the next-generation 3GPP network system, e.g. 3GPP TS 36.300 V8.8.0. FIG. 6 is an example of protocols that the terminal device 10, the base station device 20, and the MME 34 implement. A communication protocol between the terminal device 10 and the base station device 20 includes a PHY (Physical) layer 102 as a layer 1. The communication protocol includes a MAC (Medium Access Control) layer 104, a RLC (Radio Link Control) layer 106, and a PDCP (Packet Data Convergence Protocol) layer 108 as a layer 2. The communication protocol includes a RRC (Radio Resource Control) layer 110 as a layer 3. A protocol between the terminal device 10 and the MME 34 includes a NAS (Non-Access Stratum) layer 112.

A protocol between the base station device 20 and the MME 34 includes a PHY layer 122, an Ether layer 124, an IP (Internet Protocol) layer 126, a SCTP (Stream Control Transmission Protocol) layer 128, and a S1-AP layer 130.

Figure 7:
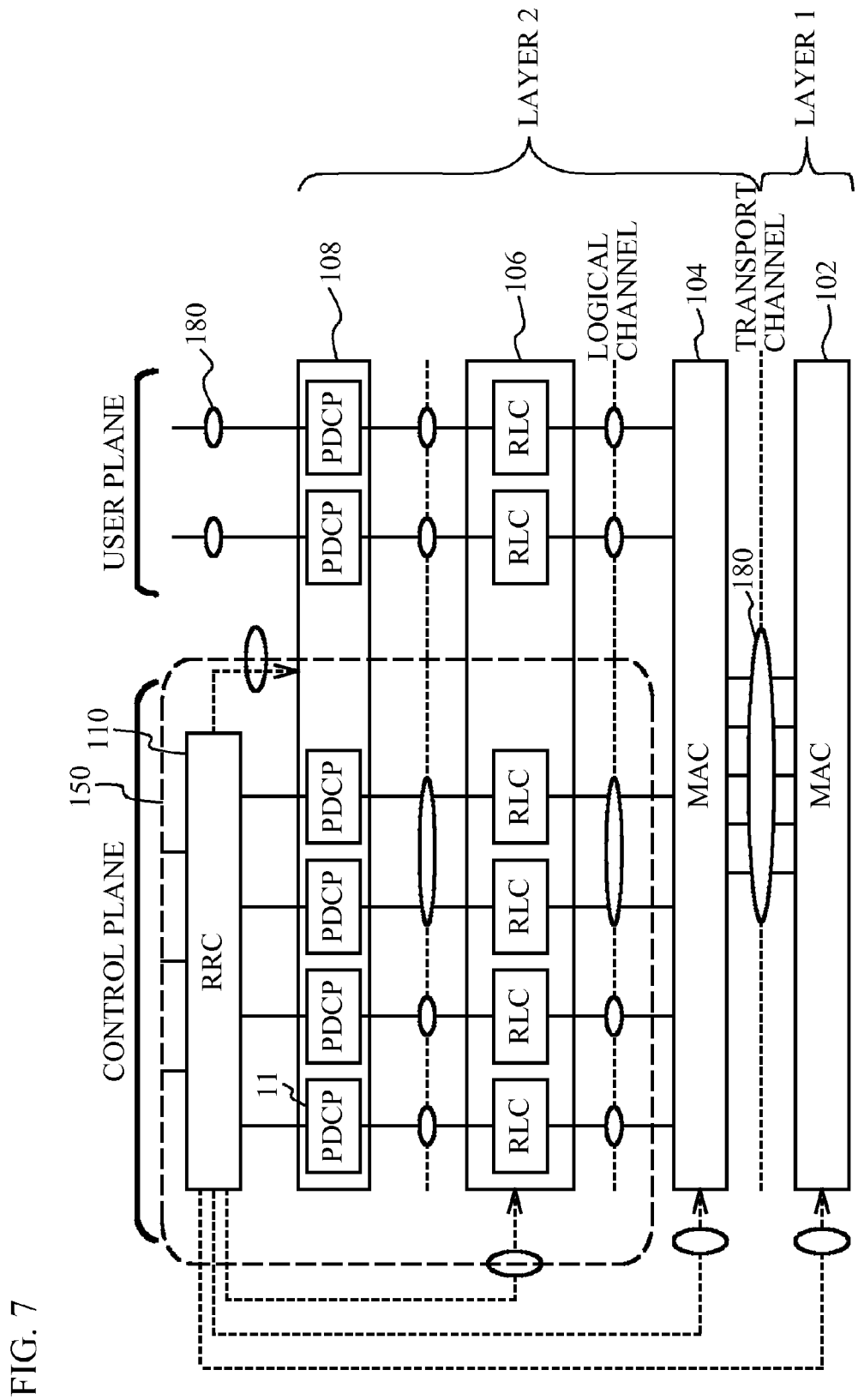
FIG. 7 is a diagram illustrating a protocol architecture of the base station device.

FIG. 7 is a diagram illustrating a protocol architecture of the base station device 20. In addition to FIG. 6, a SAP (Service Access Point) is described. A transport channel is defined between the PHY layer 102 and the MAC layer 104. A logical channel is defined between the MAC layer 104 and the RLC layer 106. Layers above the RLC layer 106 are separated into the user plain and the control plane. The MAC layer 104 mainly assigns a radio resource. The RLC layer 106 and the PDCP layer 108 mainly control a radio link. The RRC layer 110 mainly controls the PHY layer 102, the MAC layer 104, the RLC layer 106, and the PDCP layer 108, and controls the radio resource.

The range of a dashed line 150 of FIGS. 6 and 7 are the control plane 50 corresponding to the setting management units 14 and 24 of FIGS. 2 and 3. The deactivating units 16 and 26 of FIGS. 2 and 3 deactivate the protocols within the dashed line 150 in step S18 of FIG. 4 and step S44 of FIG. 5. Functions which the control plane 50 performs are e.g. an Inter-cell RRM (Radio Resource Management) function, A RBC (Radio Bearer Control) function, a CMC (Connection Mobility Control) function, a RAC (Radio Admission control) function, an eNB measurement configuration provision (Measurement Configuration & Provision) function, a scheduler function, a RRC function, and so on. On the contrary, for example, an authentication secrecy function, a resending duplication control function, and so on are functions which the control plane 50 does not perform.

Figure 8:
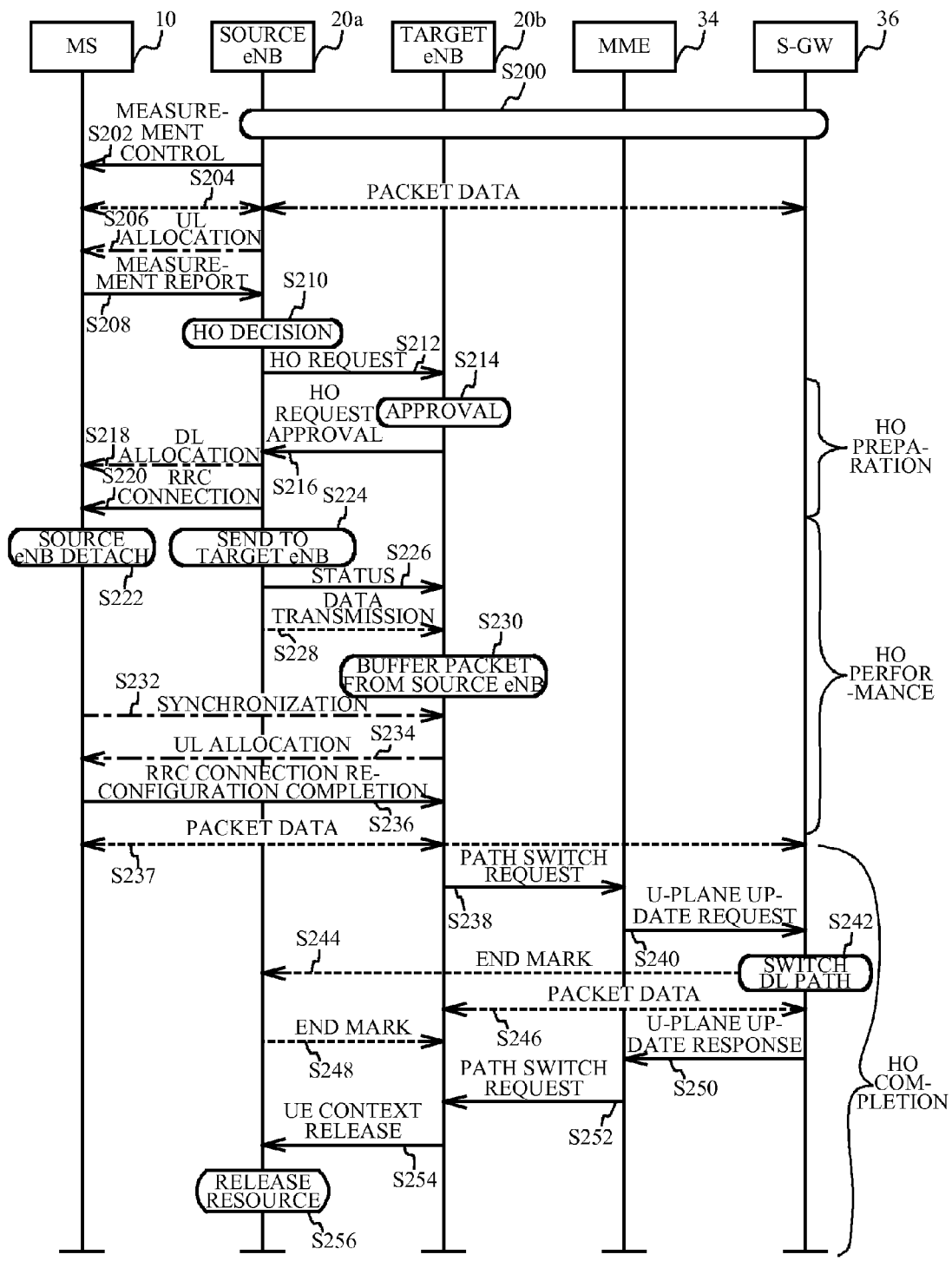
FIG. 8 is a sequence diagram of the terminal device, base station devices, the MME, and a S-GW.

Next, a description will be given of an example of control that the protocols (i.e., the control plane 50) in the range of the dashed line 150 of FIGS. 6 and 7 perform. First, a description will be given of an example of control of the movement management that the control plane 50 performs. FIG. 8 is a sequence diagram of the terminal device 10, base station devices 20*a* and 20*b*, the MME 34, and the S-GW 36. The base station device 20*a* is a base station device connected to the terminal device 10, and the base station device 20*b* is a base station device of a destination of the handover. An arrow of a dashed line is the transmission and reception of data through the user plain. An arrow of an one-point chain line is the transmission and reception of the layer 1 or 2. An arrow of a solid line indicates the transmission and reception of the layer 3.

As illustrated in FIG. 8, in the base station devices 20*a* and 20*b*, the MME 34 and the S-GW 36, the terminal device 10 and the base station device 20*a* communicates with each other in the present setting state (step S200). The base station device 20*a* causes the terminal device 10 to perform measurement control (step S202). For example, the terminal device 10 measures an electric power of CPICH (Common Pilot Channel) from the base station device 20*a* or 20*b*. In this period, the terminal device 10 transmits and receives packet data to and from the S-GW 36 via the base station device 20*a* (step S204). In this period, the base station device 20*a* performs the allocation of UL (Up Link) to the terminal device 10 (step S206). The terminal device 10 performs a measurement report to the base station device 20*a* (step S208). For example, the terminal device 10 reports the electric power of the CPICH from the base station device 20*a* or 20*b*. The base station device 20*a* decides whether to perform the handover (HO) (step S210).

In steps S212 to S220, the preparation of the HO is performed. The base station device 20*a* requests the HO from the base station device 20*b* (step S212). The base station device 20*b* approves the HO (step S214). The base station device 20*b* transmits the approval of the HO request to the base station device 20*a* (step S216). The base station device 20*a* performs the allocation of DL (Down Link) to the terminal device 10 (step S218). The base station device 20*a* transmits a RRC connection reconfiguration message to the terminal device 10 (step S220). This message also includes movement control information.

In steps S222 to S236, the HO is performed. The terminal device 10 disconnects the base station device 20*a*, and synchronizes the base station device 20*b* (step S222). The base station device 20*a* sends a prior communication situation with the terminal device 10 and packets being transmitted and received to base station device 20*b* (step S224). The base station device 20*a* transmits a status of the terminal device 10 to the base station device 20*b* (step S226). The base station device 20*a* transmits packet data being transmitted and received to and from the terminal device 10, to the base station device 20*b* (step S228). The base station device 20*b* buffers the packets from the base station device 20*a* (step S230). The terminal device 10 synchronizes the base station device 20*b* (step S232). The base station device 20*b* performs the UL allocation to the terminal device 10 (step S234). The terminal device 10 reports the completion of the RRC connection reconfiguration to the base station device 20b (step S236).

In steps S238 to S256, the completion of the HO is performed. The terminal device 10 performs the transmission and reception of packet data to and from the S-GW 36 via the base station device 20b (step S237). The base station device 20b performs a path switch request to the MME 34 (step S238). The MME 34 performs an U-plane update request to the S-GW 36 (step S240). The S-GW 36 switches a DL path, and transmits an end mark to the base station device 20a (step S244). In this period, the base station device 20b and the S-GW 36 perform the transmission and reception of packet data (step S246). The base station device 20a transmits the end mark to the base station device 20b (step S248). The S-GW 36 transmits an U-plane update response to the MME 34 (step S250). The MME 34 reports the approval of the path switch request to the base station device 50b (step S252). The base station device 20b transmits a terminal device 10 context release to the base station device 20a (step S254). The base station device 20a releases the resources (step S256).

When the deactivating unit 26 deactivates the setting management unit 24 in step S18 of FIG. 4 and step S44 of FIG. 5, the setting management unit 24 stops performing movement management between the terminal device 10, and the base station devices 20a and 20b, as illustrated in FIG. 8. Therefore, the HO of the terminal device 10 may not be performed.

Figure 9:
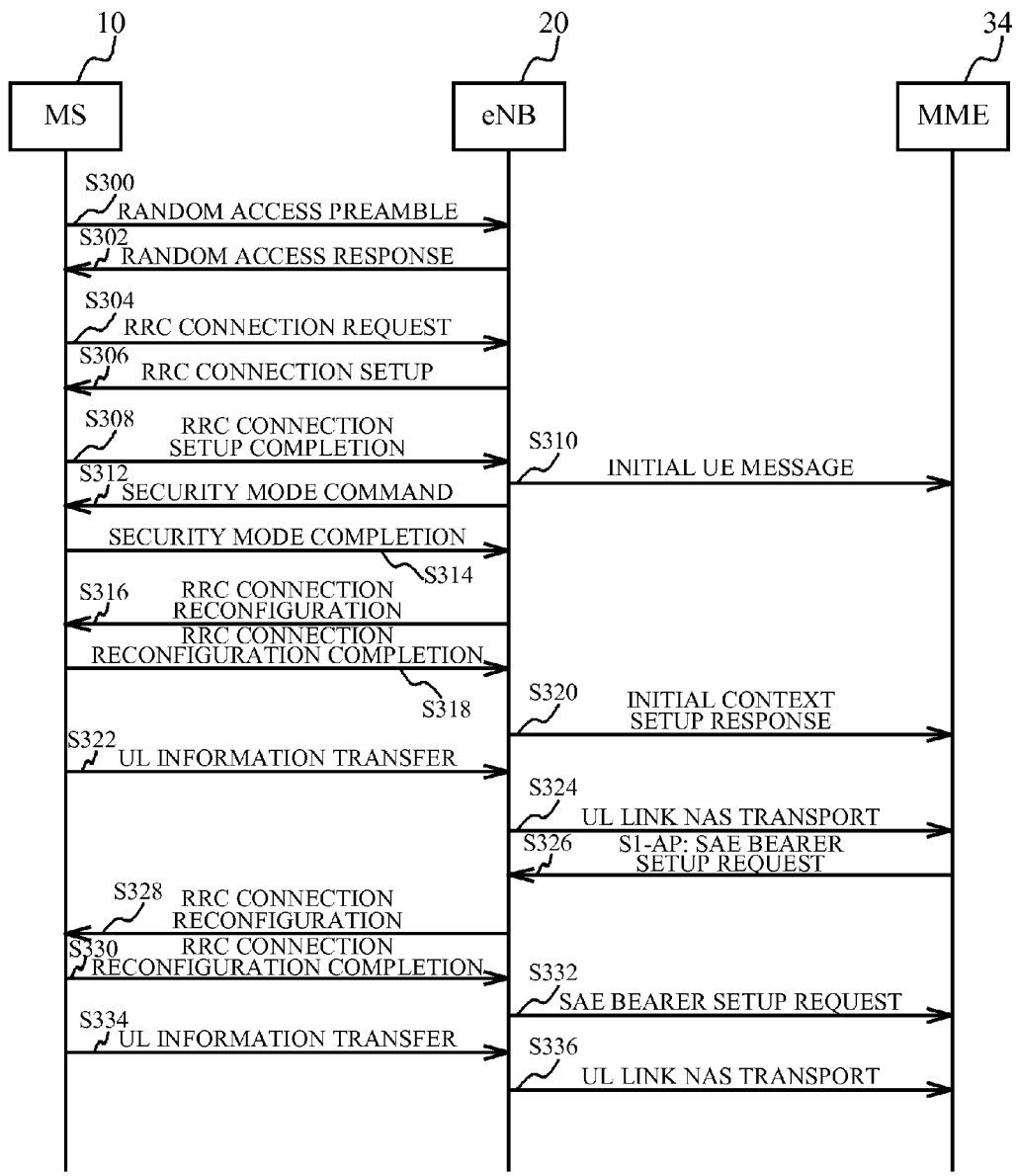
FIG. 9 is a sequence diagram of the terminal device, the base station device, and the MME.

Next, a description will be given of an example of the setting for enabling the control plane 50 to perform the control of transmission and reception of data between the base station device 20 and the terminal device 10. FIG. 9 is a sequence diagram of the terminal device 10, the base station device 20, and the MME 34.

First, in steps S300 to S318 with respect to FIG. 9, the setting of the control plane is performed. Theses steps correspond to step S11 of FIG. 4 and step S41 of FIG. 5. The terminal device 10 transmits a random access preamble to the base station device 20 (step S300). The base station device 20 transmits a random access response to the terminal device 10 (step S302). Thereby, the schedule of the setting is decided. The terminal device 10 transmits a RRC connection request to the base station device 20 (step S304). The base station device 20 transmits a RRC connection setup to the terminal device 10 (step S306). The terminal device 10 reports the completion of the RRC connection setup to the base station device 20 (step S308).

The base station device 20 transmits an initial UE message (service request: NAS message) to the MME 34 (step S310). The base station device 20 transmits a security mode command to the terminal device 10 (step S312). The terminal device 10 reports the completion of the security mode to the basic station device 20 (step S314). The base station device 20 transmits a RRC connection reconfiguration to the terminal device 10 (step S316). The terminal device 10 reports the completion of the RRC connection reconfiguration to the base station device 20 (step S318). Thus, the control plane is set.

Next, in steps S320 to S336, the setting of the user plane is performed. These steps correspond to step S10 of FIG. 4 and step S40 of FIG. 5. The base station device 20 transmits an initial context setup response to the MME 34 (step S320). The terminal device 10 transmits an UL information transfer (bearer resource allocation request: NAS message) to the base station device 20 (step S322). The base station device 20 transmits an UL link NAS transport (PDN connectivity request: NAS message) to the MME 34 (step S324). The MME 34 transmits a S1-AP: SAE (System Architecture Evolution) bearer setup request (active default EPS (Evolved Packet System) bearer context request) to the base station device 20 (step S326).

The base station device 20 transmits a RRC connection reconfiguration (active default EPS bearer context request: NAS message) to the terminal device 10 (step S328). The terminal device 10 reports the completion of the RRC connection reconfiguration to the base station device 20 (step S330). The base station device 20 transmits a SAE bearer setup request to the MME 34 (step S332). The terminal device 10 reports an UL information transfer (active default EPS bearer context accept: NAS message) to the base station device 20 (step S334). The base station device 20 transmits an UL link NAS transport (active default EPS bearer context accept: NAS message) to the MME 34 (step S336). Thus, the setting of the user plane for performing control of transmission and reception of data between the base station device 20 and the terminal device 10 is completed.

When the deactivating unit 26 deactivates the setting management unit 24 in step S18 of FIG. 4 and step S44 of FIG. 5, the setting management unit 24 may not perform the setting of the control of the transmission and reception of data between the terminal device 10 and the base station device, as illustrated in FIG. 9.

Next, a description will be given of a sequence of the terminal device 10 and the base station device 20 when the first embodiment is applied to the 3GPP TS 36.300 V8.8.0, for example.

Figure 10:
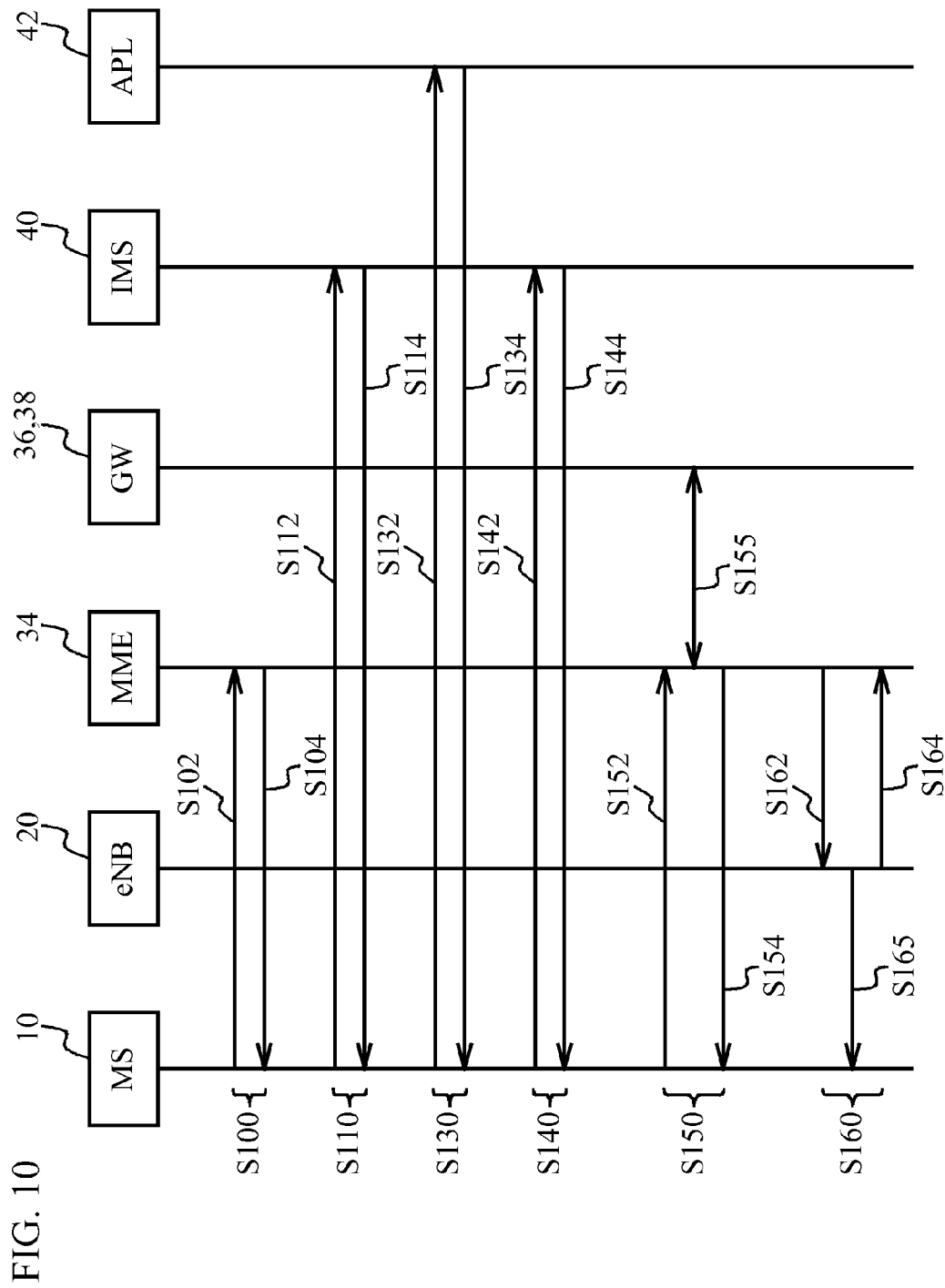
FIG. 10 is a sequence diagram of a system of the first embodiment (example 1)
Figure 11:
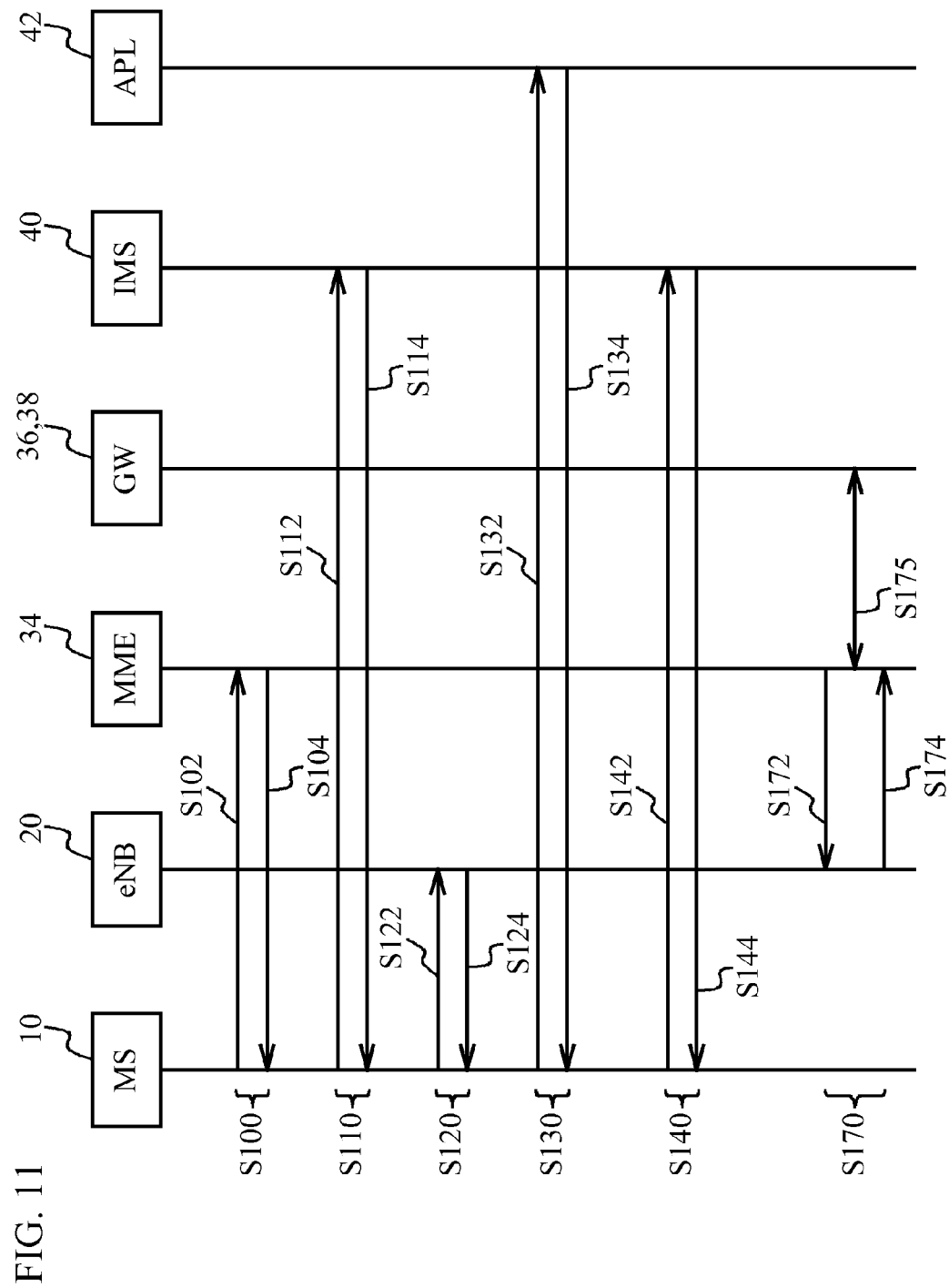
FIG. 11 is a sequence diagram of the system of the first embodiment (example 2)

FIG. 10 is a sequence diagram when the terminal device 10 is the mobile terminal, and FIG. 11 is a sequence diagram when the terminal device 10 is the non-mobile terminal. FIGS. 10 and 11 indicate sequences between the terminal device 10, the base station device 20, the MME 34, the GWs 36 and 38, and the APL 42. FIGS. 12 to 15 are diagrams illustrating states of the planes between the terminal device 10, the base station device 20, the MME 34, the S-GW 36 and the PDN-GW 38.

Figure 12:
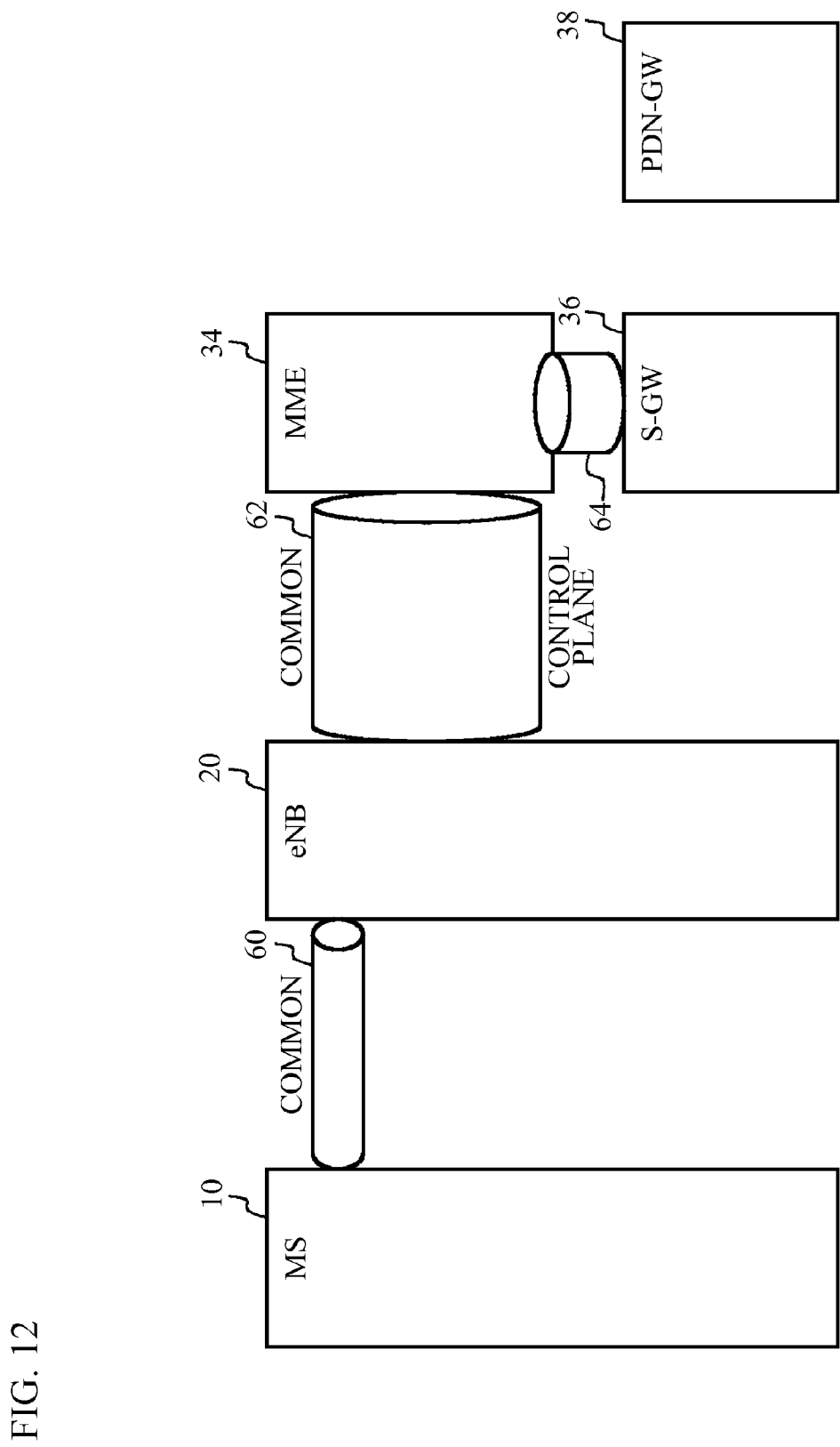
FIG. 12 is a diagram illustrating a state of planes (example 1)

FIG. 12 illustrates planes in an initial state. As illustrated in FIG. 12, a common control plane 60 is set between the terminal device 10 and the base station device 20. A common control plane 62 is set between the base station device 20 and the MME 34. A plane 64 is set between the MME 34 and the S-GW 36. The MME 34 controls the S-GW 36 by the plane 64.

First, a description will be given of a sequence when the terminal device 10 is the mobile terminal, with reference to FIG. 10. The terminal device 10 sets the control plane 50 and the user plane 52 (step S100). In step S100, the terminal device 10 request the setting of the control plane and the user plane from the MME 34 via the base station device 20 (step S102). The MME 34 sets a separate control plane and a separate user plane between the terminal device 10 and the base station device 20. For example, the MME 34 sets a RRC (Radio Resource Control), and then sets the PDN. More specifically, the control plane 50 is set as illustrated in steps S300 to S318 of FIG. 9. Then, the control plane 50 sets the user plane 52 as illustrated in steps S320 to S336 of FIG. 9.

Figure 13:
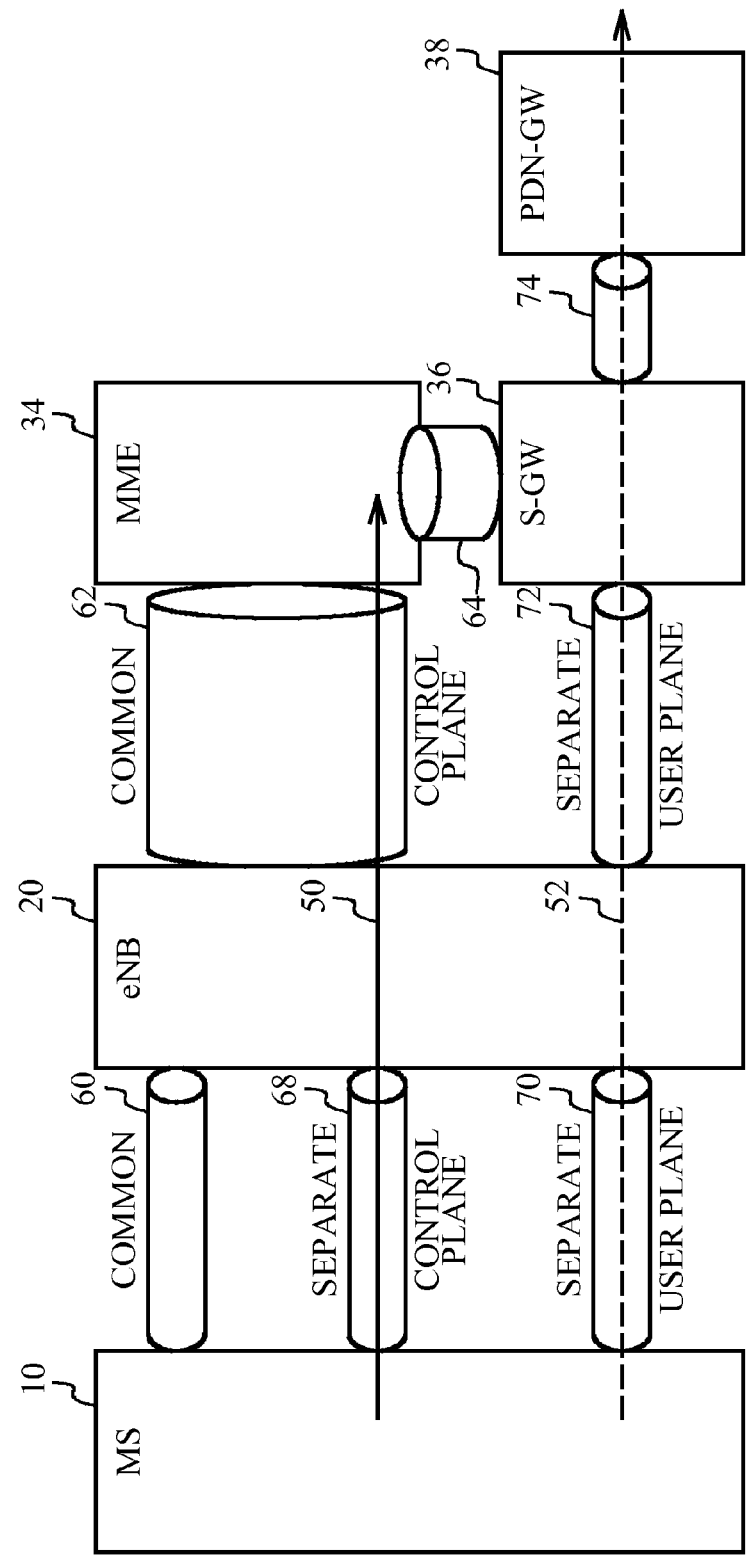
FIG. 13 is a diagram illustrating a state of the planes (example 2)

As illustrated in FIG. 13, a separate control plane 68 is set between the terminal device 10 and the base station device 20. Thus, the control plane 50 from the terminal device 10 to the MME 34 via the base station device 20 is set. A separate user plane 70 is set between the terminal device 10 and the base station device 20, a separate user plane 72 is set between the base station device 20 and the S-GW 36, and a user plane 74 is set between the S-GW 36 and the PDN-GW 38. Thereby, the user plane 52 from the terminal device 10 to the IMS 40 is set via the user planes 70, 72 and 74.

Returning to FIG. 10, the MME 34 reports the setting of the control plane 50 and the user plane 52 of the terminal device 10 and the base station device 20 (step S104). Next, the connection between the terminal device 10 and the IMS 40 is performed (step S110). In step S110, the terminal device 10 requests the connection from the IMS 40 (step S112). The IMS 40 reports the approval of the connection to the terminal device 10 (step S114).

Next, the transmission and reception of data is performed between the terminal device 10 and the APL 42 (step S130). In step S130, the terminal device 10 transmits data to the IMS 40 via the user plane 52 (step S132). The IMS 40 transmits data to the terminal device 10 via the user plane 52 (step S134). When the transmission and reception of the data is terminated, the connection between the terminal device 10 and the IMS 40 is completed (step S140). In step S140, the terminal device 10 requests the completion of the connection from the IMS 40 (step S142). The IMS 40 approves the completion of the connection with the terminal device 10 (step S144).

Next, the disconnection of the user plane 52 is performed (step S150). In step S150, the terminal device 10 requests the disconnection of the user plane 52 from the MME 34 (step S152). The MME 34 disconnects the user plane 52 (step S155). For example, the PDN-GW 38 is released. The MME 34 reports the disconnection of the user plane 52 to the terminal device 10 (step S154).

Next, the disconnection of the control plane 50 is performed (step S160). In step S160, the MME 34 requests the disconnection of the control plane 50 to the terminal device 10 from the base station device 20 (step S162). The base station device 20 causes the terminal device to disconnect the control plane 50 (step S165). For example, the base station device 20 releases the RRC (Radio resource control) connection. The base station device 20 reports the disconnection of the control plane 50 to the MME 34 (step S164).

Figure 14:
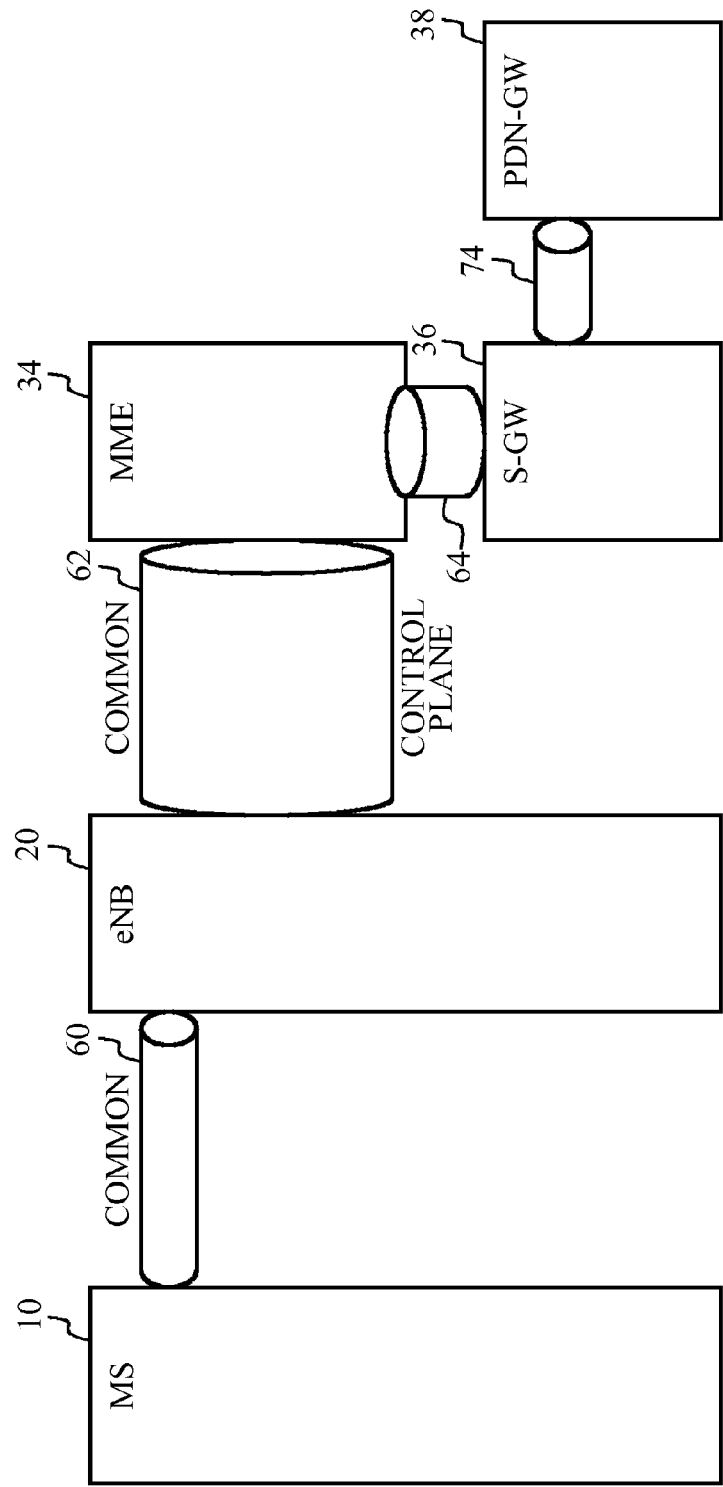
FIG. 14 is a diagram illustrating a state of the planes (example 3)

As illustrated in FIG. 14, the control plane 68 and the user planes 70 and 72 are disconnected by steps S150 and S160. Although the user plain 74 is not immediately disconnected, it may be disconnected after a given time period has elapsed from step 150.

Figure 15:
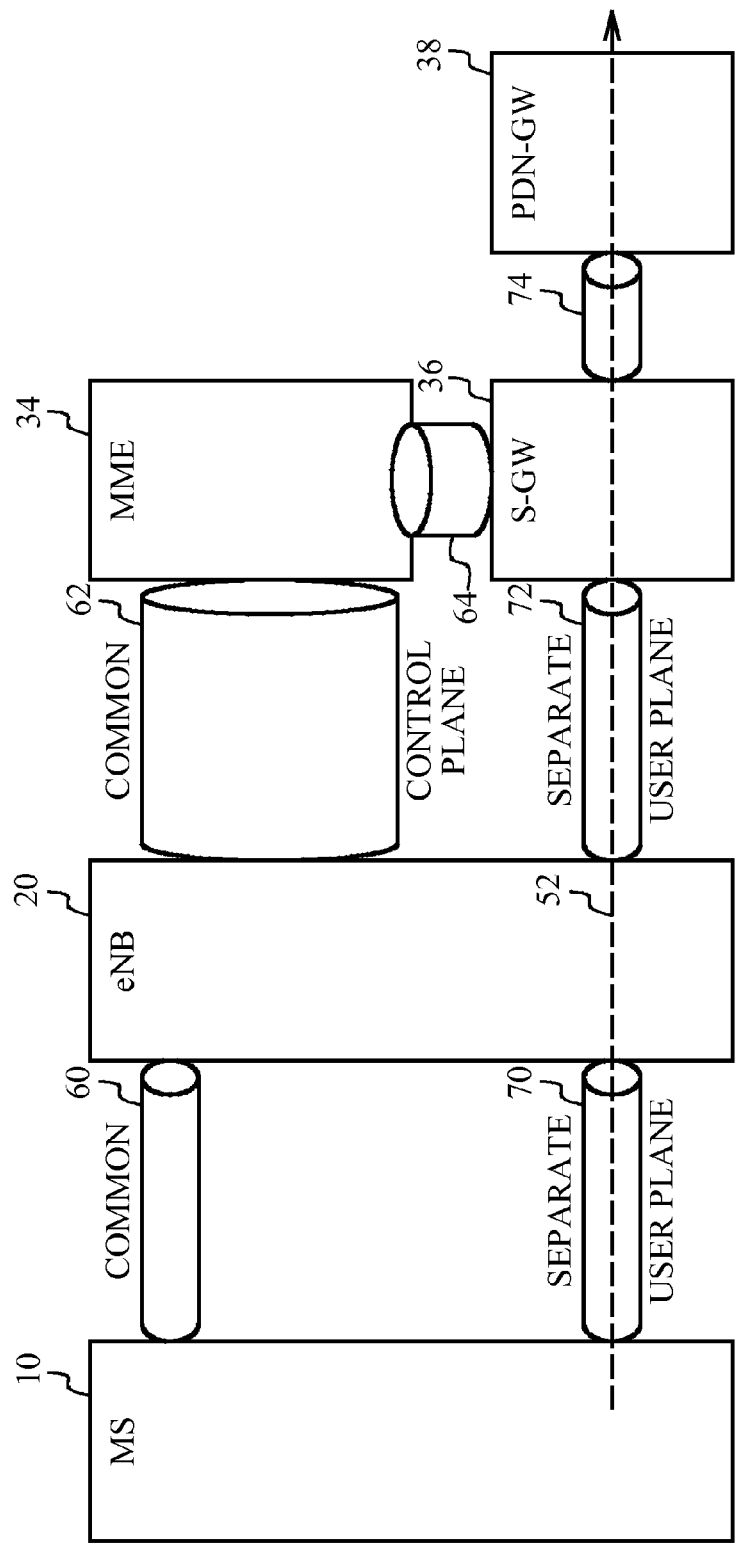
FIG. 15 is a diagram illustrating a state of the planes (example 4)

Next, a description will be given of a sequence when the terminal device 10 is the non-mobile terminal, with reference to FIG. 11. The steps S100 and S110 are the same as those in FIG. 10, and a description thereof is omitted. When the terminal device 10 is the non-mobile terminal after the connection of the terminal device 10 and the IMS 40, the terminal device 10 requests the disconnection of the control plane 50 from the base station device 20, as illustrated in step S14 of FIG. 4 (step S122). The base station device 20 instructs the disconnection of the control plane 50 to the terminal device 10 (step S124). For example, the base station device 20 releases the RRC. Thereby, the control plane 50 is released. The separate control plane 62 is disconnected as illustrated in FIG. 15. The user plane 52 is in the set state.

Returning to FIG. 11, the steps S130 and S140 are the same as those in FIG. 10, and a description thereof is omitted. Since the user plane 52 is not disconnected in step S130, the transmission and reception of data between the terminal device 10 and the IMS 40 can be performed using the user plane 52. When the connection to the IMS 40 is completed in step S140, the terminal device 10 disconnects the user plane 52, as illustrated in step S22 of FIG. 4. Since the control plane 50 is disconnected, the base station device 20 may not recognize the completion of the connection between the terminal device 10 and the IMS 40. Therefore, as illustrated in step S48 of FIG. 5, the user plane 52 is disconnected after a given time period has elapsed from the last transmission and reception of data between the terminal device 10 and the IMS 40 (step S170). In step S170, the base station device 20 requests the disconnection of the user plane 52 from the MME 34 (step S172). The MME 34 disconnects the user plane 52 (step S175). For example, the PDN-GW 38 is released. The MME 34 reports the disconnection of the user plane 52 to the base station device 20 (step S174).

According to the base station device 20 of the first embodiment, the setting management unit 24 of the base station device 20 performs the setting of the transmission and reception of data to and from the terminal device 10, as illustrated in step S40 of FIG. 5 and step S100 of FIG. 11. Then, the deactivating unit 26 of the base station device 20 deactivates the setting management unit 24 in a state where the setting of the transmission and reception of data is maintained, as illustrated in step S44 of FIG. 5 and step S120 of FIG. 11. The transmission and reception control unit 22 of the base station device 20 controls the transmission and reception of data to and from the terminal device 10 in a state where the setting management unit 24 is deactivated, as illustrated in step S46 of FIG. 5 and step S130 of FIG. 11. Thereby, the resources of the setting management unit 24 performing the movement control of the terminal device 10 can be released, and hence a power consumption can be reduced. Moreover, since the setting management unit 24 performs the setting of the transmission and reception of data to and from the terminal device 10, the resources can be further released and the power consumption can be further reduced.

When the terminal device is the mobile terminal as illustrated in step S42 of FIG. 5, the deactivating unit 26 does not deactivate the setting management unit 24, as illustrated in step S43 of FIG. 5 and step S130 of FIG. 10. On the contrary, when the terminal device is the non-mobile terminal, the deactivating unit 26 deactivates the setting management unit 24, as illustrated in step S44 of FIG. 5 and step S120 of FIG. 11. Thus, when the terminal device is the non-mobile terminal, the power consumption can be reduced by deactivating the whole of the setting management unit 24.

The deactivating unit 26 may decide whether to deactivate the setting management unit 24 according to the terminal device 10 and by using other conditions, regardless of whether the terminal device 10 is the mobile terminal or the fixed terminal.

As illustrated in step S42 of FIG. 5, the deactivating unit 26 of the base station device 20 can deactivate the setting management unit 24 based on the instruction from the terminal device 10. For example, the user can preset information on whether the terminal device 10 is the mobile terminal or the non-mobile terminal, to the memory 18 of the terminal device 10. Further, the terminal device 10 can also judge whether it is the mobile terminal.

In step S44 of FIG. 5 of the first embodiment, the control plane 50 is deleted. Thereby, the base station device 20 may not recognize whether the connection between the terminal device 10 and the IMS 40 has been completed. Consequently, as illustrated in steps S48 and S50 of FIG. 5 and step S170 of FIG. 11, the transmission and reception control unit 22 can delete the setting for the transmission and reception of data when the given time period has elapsed after the transmission and reception of data to and from the terminal device 10 is not performed. Thereby, it is possible to restrain a state where the user plane 52 has been set from being left, for example.

According to the terminal device 10 of the first embodiment, the setting management unit 14 of the terminal device 10 performs the setting of the transmission and reception of data to and from the base station device 20, as illustrated in step S10 of FIG. 4 and step S100 of FIG. 11. Then, the setting management unit 14 is deactivated in a state where the setting of the transmission and reception of data is maintained, based on the instruction of the base station device 20, as illustrated in steps S16 and S18 of FIG. 4 and step S120 of FIG. 11. The transmission and reception control unit 12 transmits and receives data to and from the base station device 20 in a state where the setting management unit 14 is deactivated, as illustrated in step S20 of FIG. 4 and step S130 of FIG. 11. Thus, the power consumption of the terminal device 10 can be reduced.

Further, as illustrated in step S14 of FIG. 4, the deactivating unit 16 can transmit information indicative of deactivating the setting management unit 14 to the base station device 20. Thereby, the user can preset whether the terminal device 10 is the mobile terminal or non-mobile terminal, to the terminal device 10, for example. Further, the terminal device 10 can also judge whether it is the mobile terminal.

Embodiment 2

Figure 16:
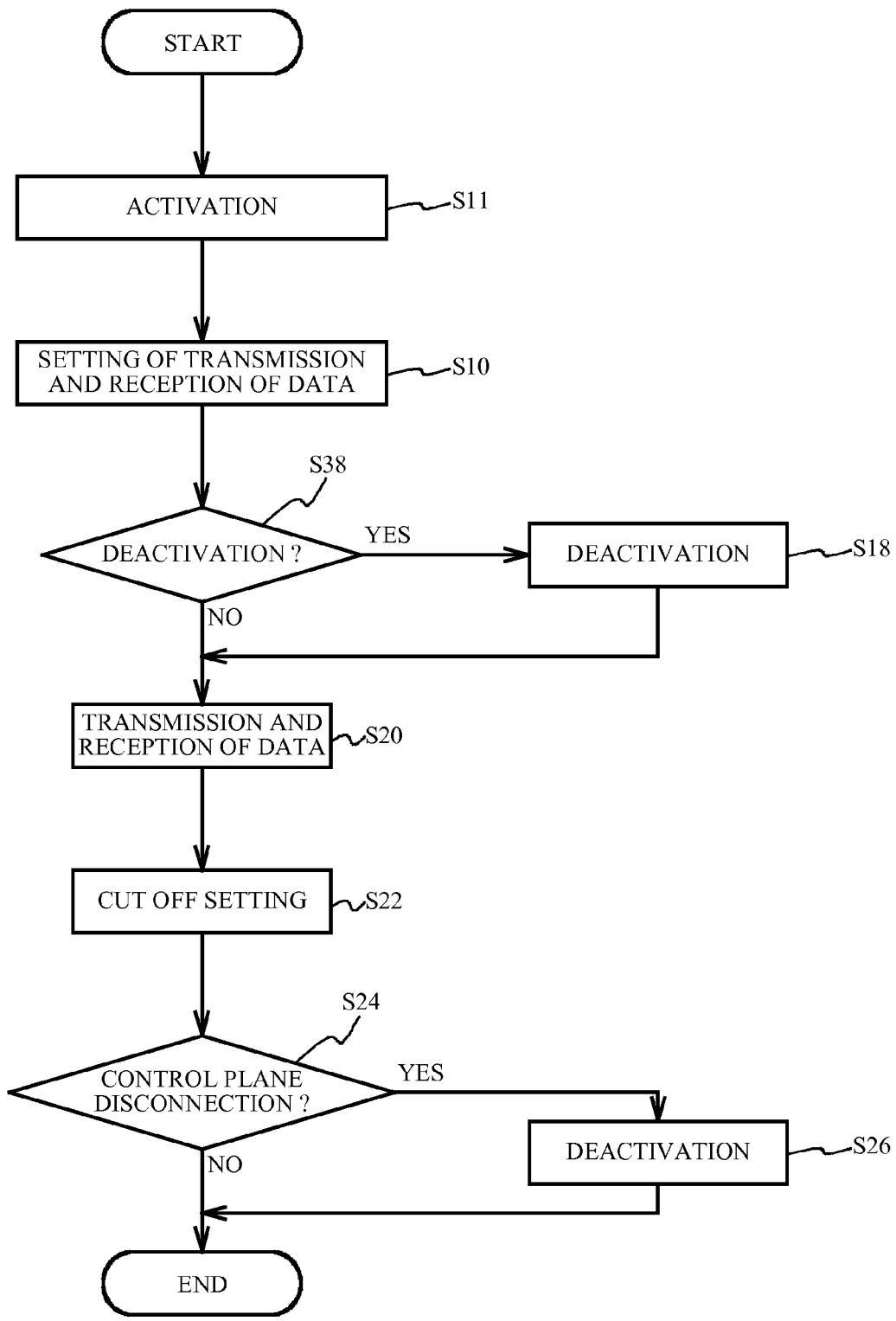
FIG. 16 is a flowchart illustrating the operation of the terminal device of a second embodiment.

A second embodiment is an example in which the base station device 20 judges the deactivation. FIG. 16 is a flowchart illustrating the operation of the terminal device 10 of the second embodiment. In the following description, a process to be performed by any one of the transmission and reception control unit 12, the setting management unit 14, and the deactivating unit 16 is performed by a processor 15. After step S10, the deactivating unit 16 judges whether an instruction of the deactivation has been received from the base station device 20 (step S38). When the judgment of step S38 is NO, the procedure proceeds to step S20. When the judgment of step S38 is YES, the deactivating unit 16 deactivates the setting management unit 14 (step S18). For example, the control plane 50 is deleted. Then, the procedure proceeds to step S20. The other operations are the same as FIG. 4 of the first embodiment, and a description thereof is omitted.

A description will be given of the operation of the base station device 20 of the second embodiment, with reference to FIG. 5. In step S42 of FIG. 5, the deactivating unit 26 judges whether to deactivate the setting management unit 24. The other operations are the same as the first embodiment, and a description thereof is omitted.

Figure 17:
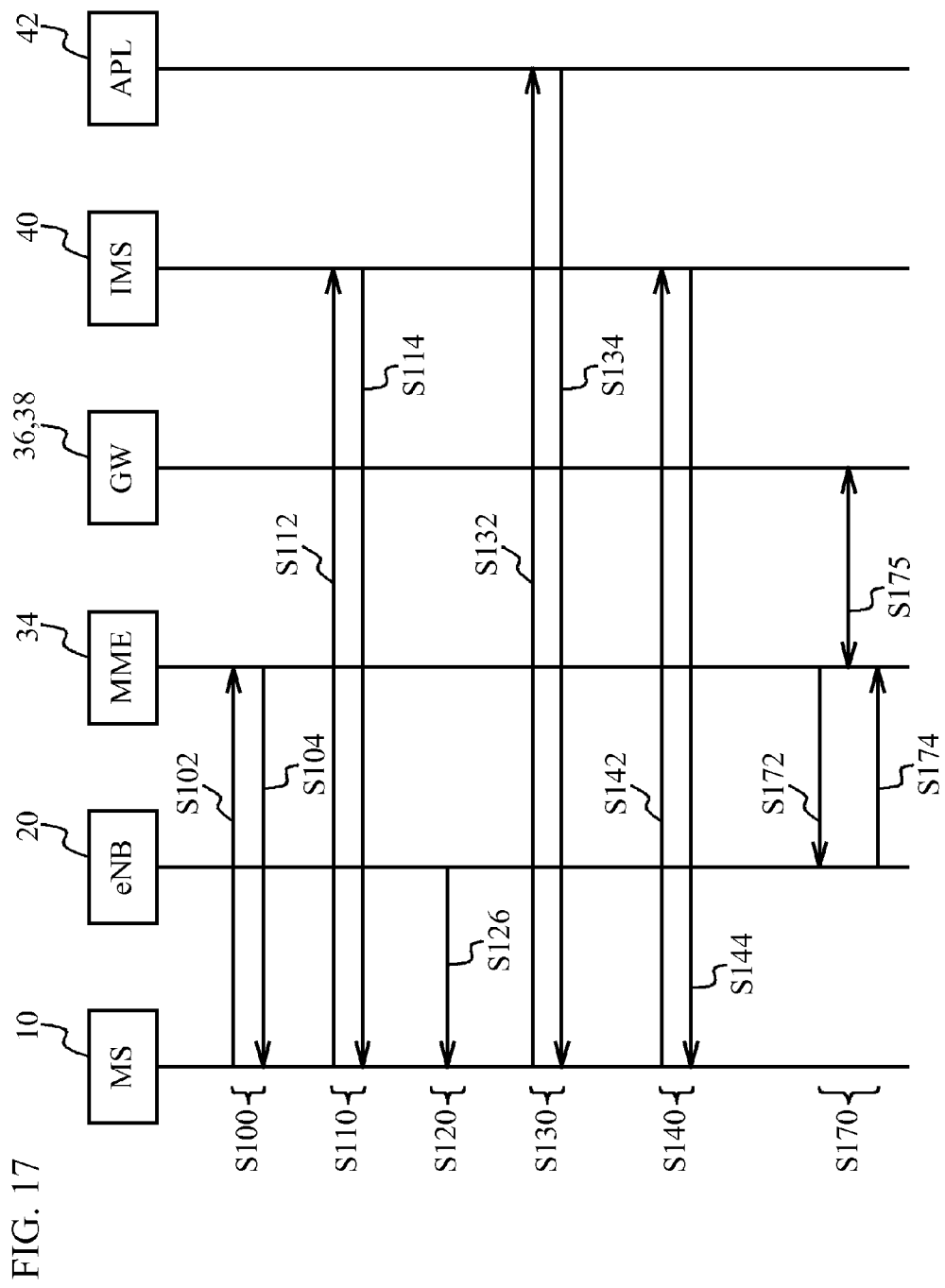
FIG. 17 is a sequence diagram of the system of the second embodiment.

FIG. 17 is a sequence diagram when the terminal device 10 is the non-mobile terminal. The sequence when the terminal device 10 is the non-mobile terminal is the same as FIG. 10 of the first embodiment, and a description thereof is omitted. When the terminal device 10 is the non-mobile terminal as illustrated in FIG. 17, the base station device 20 instructs the disconnection oh the control plane 50 to the terminal device 10 (step S126). The other sequence is the same as FIG. 11 of the first embodiment, and a description thereof is omitted.

As illustrated in the second embodiment, the base station device 20 can also judge whether the terminal device 10 is the terminal for deactivating the setting management unit. For example, information whether the user sets the terminal device to the mobile terminal or non-mobile terminal can be preset to the memory 28 of the base station device 20. Further, the base station device 20 itself can also judge whether the terminal device 10 is the mobile terminal.

Embodiment 3

Figure 18:
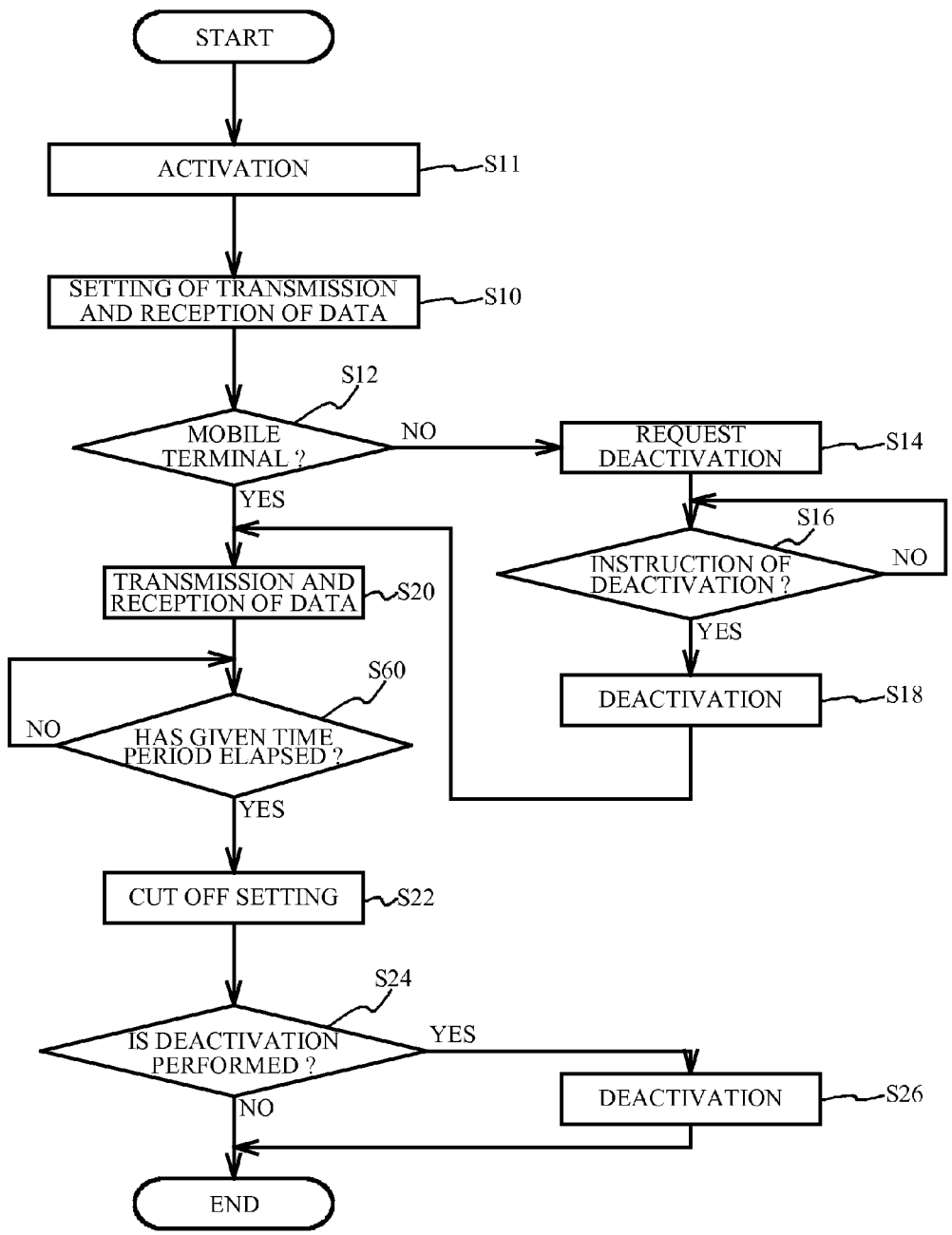
FIG. 18 is a flowchart illustrating the operation of the terminal device of a third embodiment.

FIG. 18 is a flowchart illustrating the operation of the terminal device of a third embodiment. In the following description, a process to be performed by any one of the transmission and reception control unit 12, the setting management unit 14, and the deactivating unit 16 is performed by a processor 15. As illustrated in FIG. 18, after step S20, the transmission and reception control unit 12 of the terminal device 10 judges whether a given time period has elapsed from the transmission and reception of the last data (step S60). When the judgment of step S60 is NO, the procedure returns to step S60. When the judgment of step S60 is YES, the transmission and reception control unit 12 in step S24 disconnects the setting for the transmission and reception of data to and from the base station device 20 (step S22). The other operations of the terminal device 10 are the same as FIG. 4 of the first embodiment, and a description thereof is omitted.

Figure 19:
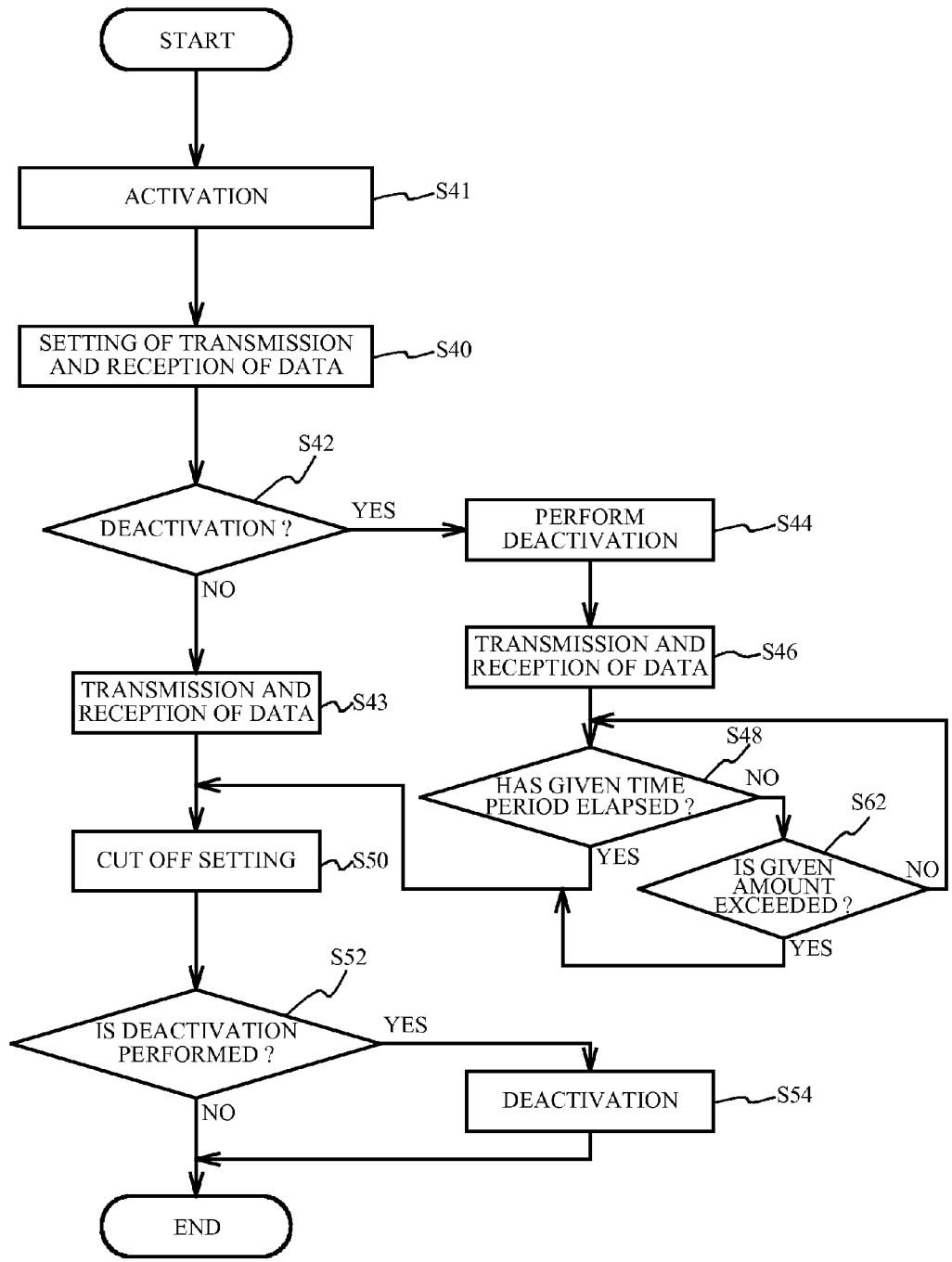
FIG. 19 is a flowchart illustrating the operation of the base station device of the third embodiment.

FIG. 19 is a flowchart illustrating the operation of the base station device of the third embodiment. In the following description, a process to be performed by any one of the transmission and reception control unit 22, the setting management unit 24, and the deactivating unit 26 is performed by a processor 25. As illustrated in FIG. 19, after step S46, the transmission and reception control unit 22 of the base station device 20 judges whether a given time period has elapsed from the transmission and reception of the last data (step S48). When the judgment of step S48 is YES, the procedure proceeds to step S50. When the judgment of step S48 is NO, the procedure proceeds to step S62. The transmission and reception control unit 22 judges whether the transmission and reception of data exceeds a given amount of data (step S62). When the judgment of step S62 is YES, the procedure proceeds to step S50. When the judgment of step S62 is NO, the procedure proceeds to step S48. The other operations of the base station device 20 are the same as FIG. 5 of the first embodiment, and a description thereof is omitted.

When the terminal device 10 is moved after the control plane 50 is deleted, the handover can be performed, for example. Therefore, the transmission and reception of data between the base station device 20 and the terminal device 10 may not be performed. According to the third embodiment, when the given time period has elapsed after the transmission and reception of data to and from the base station device 20 is not performed, as illustrated in step S60 of FIG. 18, the transmission and reception control unit 12 deletes the setting for the transmission and reception of data, as illustrated in step S22. Therefore, even when the terminal device 10 moves, and the transmission and reception of data may not be performed, the terminal device 10 can properly disconnect the user plane 52.

When the given time period has elapsed after the transmission and reception of data to and from the terminal device 10 is not performed, as illustrated in step S48 of FIG. 19, the transmission and reception control unit 22 deletes the setting for the transmission and reception of data, as illustrated in step S50. Therefore, the base station device 20 can also properly disconnect the user plane 52.

Further, when the transmission and reception of data is equal to or more than the given amount, as illustrated in step S62 of FIG. 19, the transmission and reception control unit 22 deletes the setting for the transmission and reception of data, as illustrated in step S50. Thereby, it is possible to restrain the transmission and reception of data from excessively being performed when the control plane 50 is deleted. Thus, the transmission and reception control unit 22 performs traffic management of the transmission and reception of data, and can disconnect the user plane 52 on account of the network.

When the base station device 20 disconnects the user plane 52, the terminal device 10 may not recognize the completion of the transmission and reception of data. However, when the given time period has elapsed after the transmission and reception of data to and from the terminal device 10 is not performed, as illustrated in step S48 of FIG. 19, the transmission and reception control unit 22 deletes the setting for the transmission and reception of data. Thereby, it is possible to properly delete the user plane 52.

In the first to third embodiments, the description is given of the example in which the deactivating units 16 and 26 deactivate the setting management units 14 and 24 when the terminal device 10 is the non-mobile terminal, and the deactivating units 16 and 26 do not deactivate the setting management units 14 and 24 when the terminal device 10 is the mobile terminal. The deactivating units 16 and 26 may select any terminal by the setting of the user, or their judgment, and deactivate the setting management units 14 and 24.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A base station device that communicates wirelessly with a terminal device comprising:
   a receiver configured to receive data from the terminal device; and
   a processor configured to perform setting for reception of data from the terminal device, and to deactivate a management of the terminal device after performing setting,
   wherein the receiver receives data from the terminal device in a state of deactivated management; and wherein the processor does not deactivate the management of the terminal device when the terminal device is a portable device, and the processor deactivates the management of the terminal device when the terminal device is a fixed terminal.

2. The base station device as claimed in claim 1, wherein the processor judges whether to deactivate the management of the terminal device depending on the terminal device.

3. The base station device as claimed in claim 1, wherein the receiver deletes the setting when a given time period has elapsed after the reception of data from the terminal device is not performed.

4. The base station device as claimed in claim 1, wherein the receiver deletes the setting when the reception of data from the terminal device is equal to or more than a given amount.

5. A terminal device that communicates wirelessly with a base station device comprising:
   a receiver configured to receive data from the base station device; and
   a processor configured to perform setting for reception of data from the base station device, and to deactivate a management of the terminal device after performing setting, based on an instruction of the base station device,
   wherein the receiver receives data from the base station device in a state of deactivated management.

6. The terminal device as claimed in claim 5, wherein the processor transmits information indicative of deactivating the management of the terminal device to the base station device.

7. The terminal device as claimed in claim 5, wherein the receiver deletes the setting when a given time period has elapsed after the reception of data from the base station device is not performed.

8. A communication system in which a terminal device and a base station device communicate wirelessly with each other comprising:
   the base station device including:
   a receiver configured to receive data from the terminal device;
   a processor configured to perform setting for the reception of data from the terminal device, and to deactivate a management of the terminal device after performing setting; and
   the terminal device,
   wherein the receiver receives data from the terminal device in a state of deactivated management.

9. A base station device that communicates wirelessly with a terminal device comprising:
   a receiver configured to receive data from the terminal device through a user plane set between the base station device and the terminal device; and
   a processor configured to perform setting the user plane and a control plane managing the terminal device, and does not disconnect the user plane and disconnects the control plane after setting the user plane and the control plane,
   wherein the receiver receives the data from the terminal device through the user plane after the control plane is disconnected; the processor does not disconnect the control plane when the terminal device is a portable device, and the processor disconnects the control plane when the terminal device is a fixed terminal; and the receiver receives the data from the terminal device through the user plane after the control plane is disconnected when the terminal device is the fixed terminal.

* * * * *